US 9,245,393 B2

(12) United States Patent
Yagi et al.

(10) Patent No.: US 9,245,393 B2
(45) Date of Patent: Jan. 26, 2016

(54) VEHICLE DIAGNOSTIC SYSTEM, VEHICLE DIAGNOSTIC METHOD, AND EXTERNAL DIAGNOSTIC DEVICE

(71) Applicant: HONDA MOTOR CO., LTD., Tokyo (JP)

(72) Inventors: Kensuke Yagi, Fujimi (JP); Katsuhisa Doi, Tokyo (JP); Naoki Kawahara, Tokyo (JP); Wataru Endo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 14/364,393

(22) PCT Filed: Oct. 9, 2012

(86) PCT No.: PCT/JP2012/076109

§ 371 (c)(1),
(2) Date: Jun. 11, 2014

(87) PCT Pub. No.: WO2013/099396

PCT Pub. Date: Jul. 4, 2013

(65) Prior Publication Data

US 2014/0350775 A1    Nov. 27, 2014

(30) Foreign Application Priority Data

Dec. 28, 2011  (JP) ................................. 2011-289426

(51) Int. Cl.
*G07C 5/00* (2006.01)
*G07C 5/08* (2006.01)
(Continued)

(52) U.S. Cl.
CPC ............ *G07C 5/008* (2013.01); *F02N 11/0818* (2013.01); *F02N 11/108* (2013.01);
(Continued)

(58) Field of Classification Search
CPC .. G07C 5/008; G07C 5/0816; F02N 11/0818; F02N 11/108
See application file for complete search history.

(56) References Cited

U.S. PATENT DOCUMENTS

2005/0139182 A1* 6/2005 You, II ................ F02N 11/0814
123/179.4
2005/0199209 A1   9/2005 Shimokawa et al.
(Continued)

FOREIGN PATENT DOCUMENTS

JP      03-267734 A    11/1991
JP    2000-257498 A    9/2000
(Continued)

OTHER PUBLICATIONS

International Search Report dated Jan. 8, 2013 corresponding to International Patent Application No. PCT/JP2012/076109 and English translation thereof.
(Continued)

*Primary Examiner* — Mussa A Shaawat
*Assistant Examiner* — Kelly D Williams
(74) *Attorney, Agent, or Firm* — Squire Patton Boggs (US) LLP

(57) ABSTRACT

In a vehicle diagnostic system and a vehicle diagnostic method, malfunction codes recorded in each ECU in a vehicle include idle stop malfunction codes that disallow idle stop, and a non-idle stop malfunction code that does not disallow idle stop. The idle stop malfunction codes include: a first idle stop malfunction code that operates a warning light provided corresponding to a specific ECU; and a second idle stop malfunction code that does not operate the relevant warning light. An external diagnostic device extracts, from the plurality of ECUs, only the second idle stop malfunction codes, among the first idle stop malfunction codes and the second idle stop malfunction codes, when performing malfunction diagnosis for non-execution of idle stop.

6 Claims, 15 Drawing Sheets

(51) Int. Cl.
*F02N 11/08* (2006.01)
*F02N 11/10* (2006.01)

(52) U.S. Cl.
CPC ......... *G07C5/0816* (2013.01); *F02N 2200/023* (2013.01); *F02N 2200/061* (2013.01); *F02N 2200/0801* (2013.01); *F02N 2200/0802* (2013.01); *F02N 2200/0808* (2013.01); *F02N 2200/0814* (2013.01); *F02N 2200/101* (2013.01); *F02N 2200/103* (2013.01); *F02N 2200/106* (2013.01); *F02N 2200/122* (2013.01); *G07C 2205/02* (2013.01)

(56) References Cited

U.S. PATENT DOCUMENTS

| | | | |
|---|---|---|---|
| 2006/0116797 A1* | 6/2006 | Moran | B60K 6/12 701/22 |
| 2007/0124037 A1* | 5/2007 | Moran | B60K 6/12 701/22 |
| 2008/0294329 A1 | 11/2008 | Noda | |
| 2009/0259358 A1 | 10/2009 | Andreasen | |
| 2009/0326757 A1 | 12/2009 | Andreasen et al. | |
| 2011/0077828 A1 | 3/2011 | Matsuda et al. | |
| 2011/0093160 A1 | 4/2011 | Ramseyer | |
| 2011/0298276 A1* | 12/2011 | Takahashi | F02N 11/0825 307/10.6 |

FOREIGN PATENT DOCUMENTS

| | | |
|---|---|---|
| JP | 2004-224269 A | 8/2004 |
| JP | 2008-291702 A | 12/2008 |
| JP | 2009-222018 A | 10/2009 |
| JP | 2011-127439 A | 6/2011 |
| WO | WO 2009/147982 A1 | 12/2009 |

OTHER PUBLICATIONS

Extended European Search Report dated Aug. 10, 2015 corresponding to European Patent Application No. 12862776.7.
Hu Jie et al., "Developing PC-Based Automobile Diagnostic System Based on OBD System,"Power and Energy Engineering Conference (APPEEC), 2010 Asia-Pacific Date of Conference: Mar. 28-31, 2010, IEEE, Mar. 28, 2010, pp. 1-5, XP031658868.
Anonymous: "On-board Diagnostics—Wikipedia, the free encyclopedia," Jul. 29, 2015, XP055205253, retrieved from Internet: URL:https://en.wikipedia.org/wiki/On-boarddiagnostics.

* cited by examiner

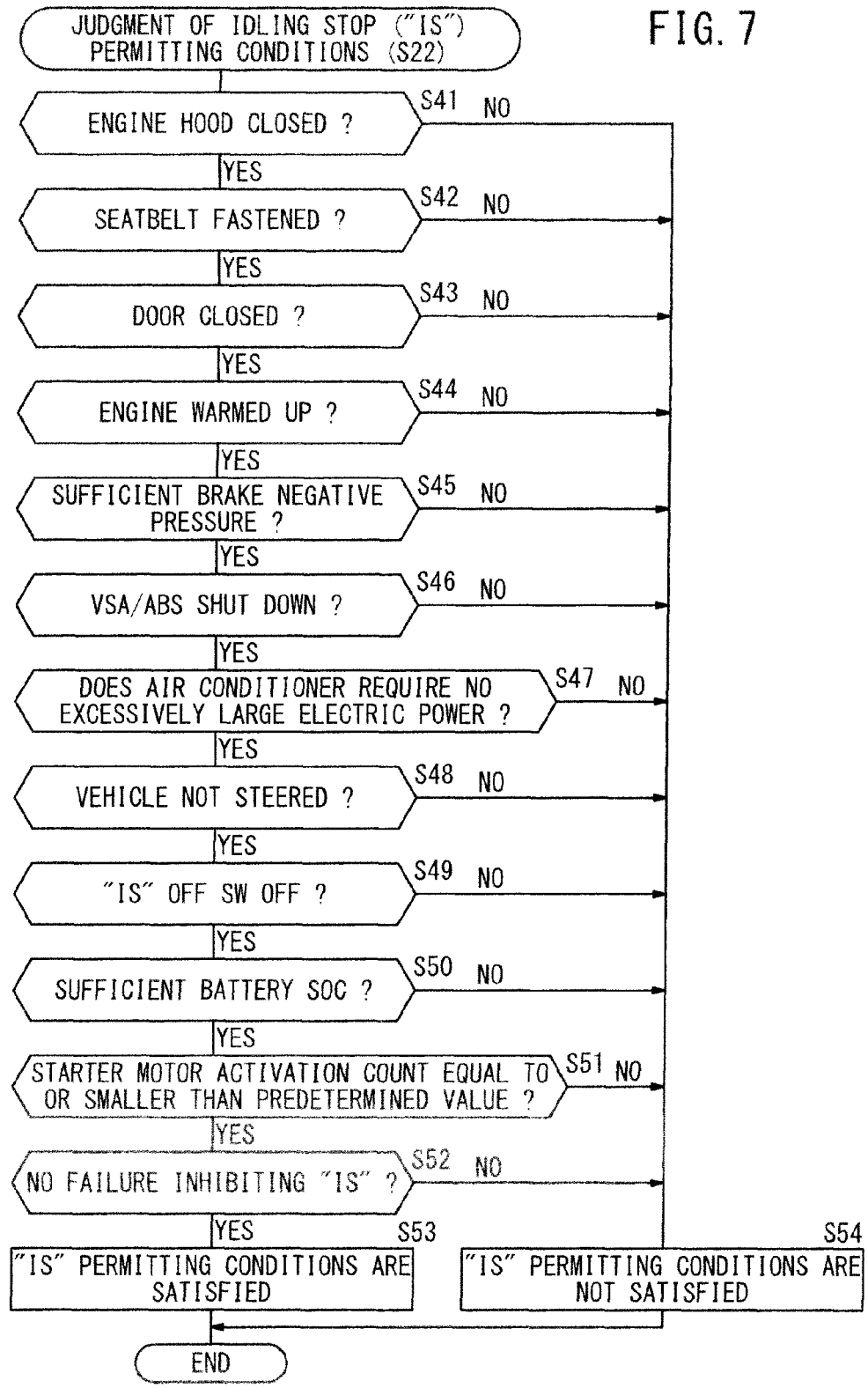

FIG. 8

EXAMPLES OF FAULTS THAT CAUSE WARNING LAMPS TO BE LIGHTED AND THAT INHIBIT IDLING STOP ("IS")

| FAULTY COMPONENT | DISPLAY | FAULT CODE | CORRESPONDING ECU | FAULT CODE TYPE |
|---|---|---|---|---|
| COOLANT TEMPERATURE SENSOR |  | AAAA | ENG ECU | FIRST "IS" FAULT CODE |
| ABS |  | BBBB | ABS ECU | FIRST "IS" FAULT CODE |
| 12 V BATTERY |  | CCCC | BATTERY ECU | FIRST "IS" FAULT CODE |

EXAMPLES OF FAULTS THAT DO NOT CAUSE WARNING LAMPS TO BE LIGHTED BUT THAT INHIBIT "IS"

| FAULTY COMPONENT | DISPLAY | FAULT CODE | CORRESPONDING ECU | FAULT CODE TYPE |
|---|---|---|---|---|
| AIR CONDITIONER |  | DDDD | AIR CONDITIONER ECU | SECOND "IS" FAULT CODE |
| SHIFT POSITION SENSOR |  | EEEE | ENG ECU | SECOND "IS" FAULT CODE |
| 12V BATTERY |  | FFFF | BATTERY ECU | SECOND "IS" FAULT CODE |

EXAMPLES OF FAULTS THAT DO NOT CAUSE WARNING LAMPS TO BE LIGHTED AND THAT DO NOT INHIBIT "IS"

| FAULTY COMPONENT | DISPLAY | FAULT CODE | CORRESPONDING ECU | FAULT CODE TYPE |
|---|---|---|---|---|
| IMMOBILIZER | NONE | GGGG | IMMOBILIZER ECU | NON-"IS" FAULT CODE |
| AIR CONDITIONER | NONE | HHHH | AIR CONDITIONER ECU | NON-"IS" FAULT CODE |
| 12 V BATTERY | NONE | IIII | BATTERY ECU | NON-"IS" FAULT CODE |

FIG. 12

DIAGNOSTIC RESULTS

| 12 V BATTERY SOH | : OK |
|---|---|
| STARTER MOTOR ACTIVATION COUNT | : OK |
| ENG ECU | : NO FAULT CODE |
| VSA ECU | : BBBB |
| ABS ECU | : NO FAULT CODE |
| BRAKE NEGATIVE PRESSURE ECU | : NO FAULT CODE |
| EPS ECU | : NO FAULT CODE |
| BATTERY ECU | : NO FAULT CODE |
| METER ECU | : NO FAULT CODE |
| AIR CONDITIONER ECU | : NO FAULT CODE |
| SRS ECU | : NO FAULT CODE |
| ⋮ | ⋮ |

FIG. 13

| | | JUDGED RESULT AND PRESENT STATUS | "IS" PRECONDITIONS /"IS" PERMITTING CONDITIONS |
|---|---|---|---|
| IDLING STOP CONDITIONS (AND) | SHIFT POSITION | ○ NEUTRAL | NEUTRAL |
| | CLUTCH PEDAL | ○ CLUTCH OPERATED AMOUNT = 0 | CLUTCH OPERATED AMOUNT = 0 |
| | ACCELERATOR PEDAL | ○ ACCELERATOR OPERATED AMOUNT = 0 | ACCELERATOR OPERATED AMOUNT = 0 |
| | VEHICLE SPEED | ○ 0 km/h | 2 km/h OR LOWER |
| | ENGINE HOOD | ○ CLOSED | CLOSED |
| | SEATBELT | ○ FASTENED | FASTENED |
| | DOOR | ○ DRIVER SEAT-SIDE DOOR CLOSED | DRIVER SEAT-SIDE DOOR CLOSED |
| | TRAVELING HISTORY | ○ 45 km/h | 5 km/h OR HIGHER |
| | ENGINE COOLANT TEMPERATURE | ○ 90 °C | 45 °C OR HIGHER |
| | BRAKE NEGATIVE PRESSURE | ○ 50 kPa | 39.1 kPa OR HIGHER |
| | VSA/ABS | ○ SHUT DOWN | INHIBITED WHILE IN OPERATION |
| | OUTSIDE AIR TEMPERATURE | ○ 25 °C | -20 °C ~ 40 °C (ONLY WHILE AIR CONDITIONER IS OPERATED) |
| | STEERING | ○ NOT STEERED | NOT STEERED |
| | "IS" OFF SW | ○ OFF | OFF |
| | BATTERY CHARGED STATE | × SOC 25 % | SOC 40 % OR GREATER |
| | STARTER MOTOR ACTIVATION COUNT | ○ 120000 | 10000000 |
| | "IS" FAULT CODE | ○ NONE | NONE |

VEHICLE DIAGNOSTIC SYSTEM, VEHICLE DIAGNOSTIC METHOD, AND EXTERNAL DIAGNOSTIC DEVICE

TECHNICAL FIELD

The present invention relates to a vehicle diagnosing system, a vehicle diagnosing method, and an external diagnosing apparatus (device) for performing a fault diagnosis about the non-execution of an idling stop control process on a drive source, such as an engine or the like, of a vehicle having an idling stop control system.

BACKGROUND ART

In the event of some fault occurring in a vehicle while the vehicle is being driven, it has heretofore been customary for an electronic control unit (hereinafter referred to as "ECU") on the vehicle which deals with the faulty component to record fault information such as a fault code or the like. If a serious fault such as a fault with respect to an engine combustion or exhaust system of the vehicle occurs, it has been the practice to turn on a warning lamp on the instrument panel to let the driver know the occurrence of the fault.

For example, if an engine coolant temperature sensor of the vehicle fails, then an engine ECU records a fault code "PXXXX" and turns on a PGM-FI warning lamp to indicate the fault to the driver.

For repairing the vehicle, the repair shop worker connects an external diagnosing apparatus to a data link connector of the vehicle, and reads fault codes accumulated in the engine ECU, which is an ECU concerned with engine coolant temperature faults, to confirm or recognize details of the failure. Therefore, the repair shop worker can spot the location and cause of the failure relatively easily.

Attempts have been made to let the driver of a vehicle know its states in combination with a system, known as an idling stop control system, that automatically stops the engine of the vehicle from idling when the vehicle comes to a halt based on an overall judgment made in view of various factors including a reduction in fuel consumption. The idling stop control system judges whether the engine should be stopped from idling or not, using various ECUs that cooperatively judge merits and demerits of the engine stopped from idling. When the engine is stopped from idling by the idling stop control system, the fact that the engine is stopped from idling is displayed on an instrument panel, making the driver rest assured at the time the vehicle stops moving (see, for example, Abstract of Japanese Laid-Open Patent Publication No. 2004-224269).

SUMMARY OF INVENTION

However, if the engine of a vehicle with an idling stop control function is not automatically stopped from idling when the vehicle stops moving, then the driver is unable to decide whether the engine keeps idling because the idling stop control function has failed or because some conditions for not stopping the engine from idling have been satisfied. If it frequently happens that the engine is not automatically stopped from idling when the vehicle stops moving, then the driver may have the sense of mistrust that the idling stop control function has failed, and may often be liable to contact the vehicle dealer to ask if the idling stop control function has failed even though it is working properly.

In order to diagnose a failure of the idling stop control system to stop the engine from idling, it is necessary to individually access all involved ECUs in the vehicle to read fault information such as fault codes recorded in the ECUs by connecting an external diagnosing machine to the ECUs. It is quite time-consuming to extract the necessary information from all those ECUs. In addition, since all the fault information including fault codes is read from the ECUs, it includes fault information that has nothing to do with the idling stop control system, and hence it is also quite time-consuming to verify the extracted fault information.

The present invention has been made in view of the above difficulties. It is an object of the present invention to provide a vehicle diagnosing system, a vehicle diagnosing method, and an external diagnosing apparatus which are capable of simply or quickly confirming whether a fault has occurred or not, or of simply or quickly performing a fault diagnosis about the non-execution of an idling stop control process in a vehicle having an idling stop control system.

According to the present invention, there is provided a vehicle diagnosing system for performing a fault diagnosis of a vehicle by performing communication between a plurality of electronic control units in the vehicle and an external diagnosing apparatus and reading fault codes recorded in the electronic control units into the external diagnosing apparatus, wherein the vehicle comprises a plurality of warning lamps associated with specific ones of the electronic control units, and configured to demand an inspection or repair of a failure which has occurred in the vehicle, and an idling stop controller configured to automatically execute an idling stop for stopping a drive source of the vehicle from idling when a predetermined condition is satisfied, wherein when the electronic control units detect a fault in target ranges controlled thereby, the electronic control units record the fault codes, the fault codes include idling stop fault codes defined as inhibiting the idling stop, and non-idling stop fault codes not defined as inhibiting the idling stop, the idling stop fault codes include first idling stop fault codes defined as energizing the warning lamps and second idling stop fault codes not defined as energizing the warning lamps, and for performing a fault diagnosis with respect to non-execution of the idling stop, the external diagnosing apparatus extracts only the second idling stop fault codes, among the first idling stop fault codes and the second idling stop fault codes, from the electronic control units.

According to the present invention, for performing a fault diagnosis with respect to the non-execution of an idling stop, second idling stop fault codes are extracted, but first idling stop fault codes are not extracted, from the electronic control units. Therefore, it is possible to narrow down inspection items for the fault diagnosis with respect to the non-execution of the idling stop. In addition, when the electronic control units are requested to send second idling stop fault codes, the amount of communication between the electronic control units in the vehicle and the external diagnosing apparatus can be reduced. Consequently, the fault diagnosis with respect to the non-execution of the idling stop can be performed simply and quickly.

The above advantages manifest themselves if there are a great many electronic control units, e.g., several hundred electronic control units, which may possibly record idling stop fault codes that are defined as inhibiting the idling stop.

The external diagnosing apparatus may inquire of the electronic control units which may possibly have the second idling stop fault codes recorded for recorded second idling stop fault codes, and display answers from the electronic control units on a display unit of the external diagnosing apparatus in association with the electronic control units. Therefore, it is possible to display recorded second idling stop fault codes and details thereof with respect to the respective electronic control units which may possibly have second idling stop fault codes recorded. The displayed information thus makes it easy for the operator to judge and verify the results of the inquiries made by the external diagnosing apparatus.

The external diagnosing apparatus may have a database having the second idling stop fault codes registered in association with the electronic control units which may possibly have the second idling stop fault codes recorded, and read out the second idling stop fault codes and other fault codes from the electronic control units which may possibly have the second idling stop fault codes recorded, compare the read fault codes with the fault codes registered in the database in association with the electronic control units which may possibly have the second idling stop fault codes recorded, and extracts the second idling stop fault codes.

Consequently, even though the fault codes read out by the external diagnosing apparatus include fault codes other than second idling stop fault codes, the external diagnosing apparatus can simply extract second idling stop fault codes.

The vehicle may include, separately from the warning lamps, an idling stop failure indicator configured to indicate an idling stop fault corresponding to one of the second idling stop fault codes when the idling stop fault which records the one of the second idling stop fault codes in any of the electronic control units has occurred. When a fault occurs which is not serious enough to energize the warning lamps, but which inhibits an idling stop, the driver of the vehicle can recognize that the fault has occurred based on the idling stop failure indicated by the idling stop failure indicator.

According to the present invention, there is also provided a vehicle diagnosing method of performing a fault diagnosis of a vehicle by performing communication between a plurality of electronic control units in the vehicle and an external diagnosing apparatus and reading out fault codes recorded in the electronic control units into the external diagnosing apparatus, wherein the vehicle comprises a plurality of warning lamps associated with specific ones of the electronic control units, configured to demand an inspection or repair of a failure which has occurred in the vehicle, and an idling stop controller configured to automatically execute an idling stop for stopping a drive source of the vehicle from idling when a predetermined condition is satisfied, wherein when the electronic control units detect a fault in target ranges controlled thereby, the electronic control units record the fault codes, the fault codes include idling stop fault codes defined as inhibiting the idling stop, and non-idling stop fault codes not defined as inhibiting the idling stop, the idling stop fault codes include first idling stop fault codes defined as energizing the warning lamps and second idling stop fault codes not defined as energizing the warning lamps, and for performing a fault diagnosis with respect to non-execution of the idling stop, the external diagnosing apparatus extracts only the second idling stop fault codes, among the first idling stop fault codes and the second idling stop fault codes, from the electronic control units.

According to the present invention, there is further provided an external diagnosing apparatus for performing a fault diagnosis of a vehicle by communicating with a plurality of electronic control units in the vehicle and reading out fault codes recorded in the electronic control units into the external diagnosing apparatus, wherein the fault codes are recorded when the electronic control units detect a fault in target ranges controlled thereby, the fault codes include idling stop fault codes defined as inhibiting an idling stop for stopping a drive source of the vehicle from idling, and non-idling stop fault codes not defined as inhibiting the idling stop, the idling stop fault codes include first idling stop fault codes defined as energizing warning lamps of the vehicle, the warning lamps being associated with specific ones of the electronic control units and configured to demand an inspection or repair of a failure which has occurred in the vehicle, and second idling stop fault codes not defined as energizing the warning lamps, and for performing a fault diagnosis with respect to the non-execution of the idling stop, the external diagnosing apparatus extracts only the second idling stop fault codes, among the first idling stop fault codes and the second idling stop fault codes, from the electronic control units.

BRIEF DESCRIPTION OF DRAWINGS

FIG. 7 is a flowchart of a process (details of S22 in FIG. 4) carried out by the engine ECU for judging IS permitting conditions;

FIG. 8 is a diagram showing examples of faults corresponding to first IS fault codes, second IS fault codes, and non-IS fault codes;

FIG. 12 is a view showing by way of example a screen displayed when the external diagnosing apparatus confirms various components of the vehicle while an idling stop indicator lamp (hereinafter referred to as "IS indicator lamp") is being lighted in red;

FIG. 13 is a view showing by way of example a screen displayed when the external diagnosing apparatus confirms various components of the vehicle while the IS indicator lamp is not being lighted in red;

DESCRIPTION OF EMBODIMENTS

A. Embodiment
[1. Arrangement]
(1-1. Overall Arrangement)

Figure 1:
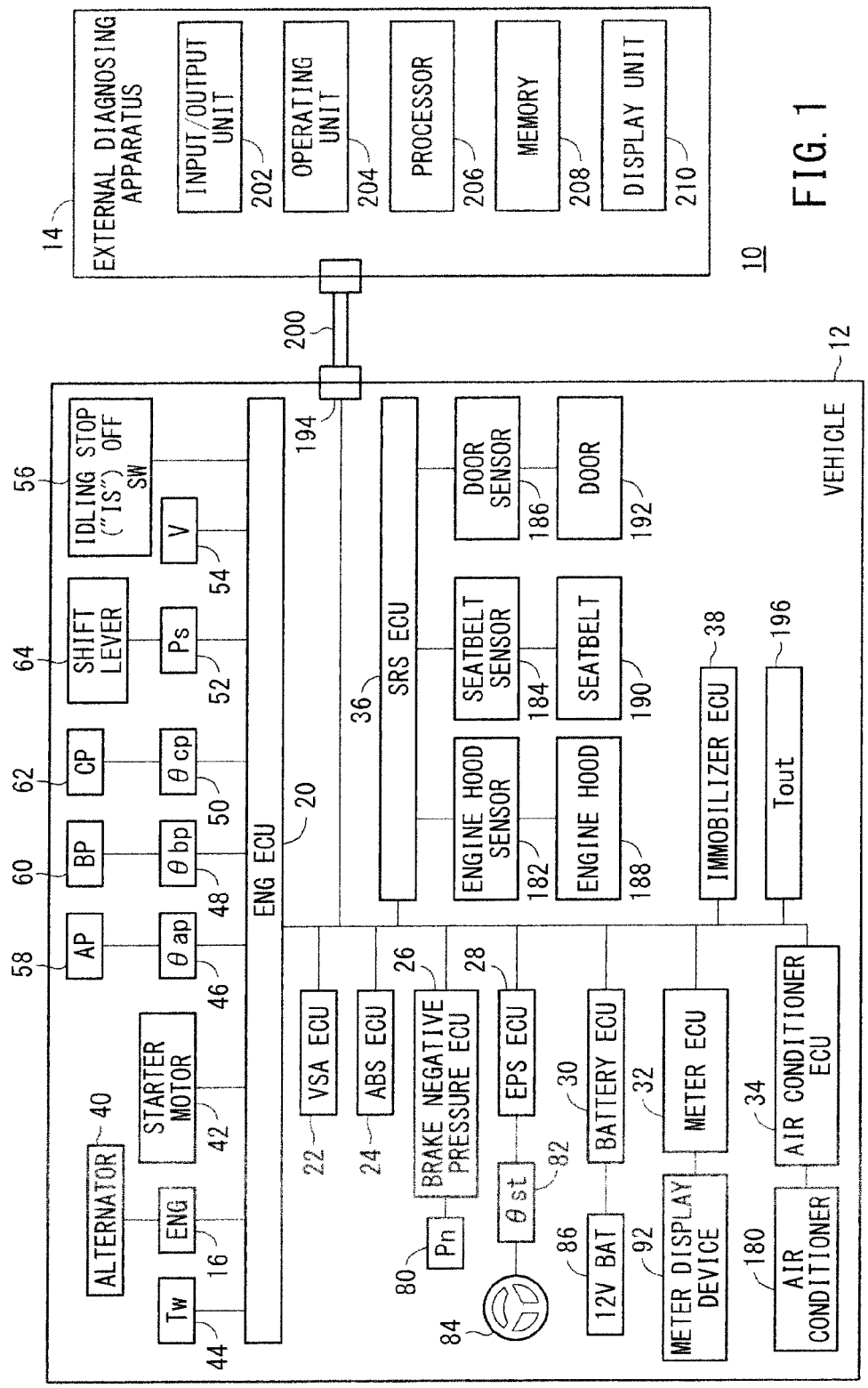
FIG. 1 is a block diagram showing a general arrangement of a vehicle diagnosing system according to an embodiment of the present invention.

FIG. 1 shows in block form a general arrangement of a vehicle diagnosing system 10 (hereinafter referred to as "system 10") according to an embodiment of the present invention. As shown in FIG. 1, the system 10 includes a vehicle 12 as a diagnostic target and an external diagnosing apparatus 14 for diagnosing the condition of the vehicle 12 from outside of the vehicle 12. The condition of the vehicle 12 can be self-diagnosed.

(1-2. Vehicle 12)
(1-2-1. Vehicle 12 in Its Entirety)

The vehicle 12 is a diesel-powered vehicle having an engine 16 and also a manual transmission (MT) vehicle. As described later, the vehicle 12 may be a gasoline-powered vehicle (including a hybrid vehicle) or an electric vehicle (including a fuel cell vehicle). The vehicle 12 may be a vehicle other than an MT vehicle, e.g., an automatic transmission vehicle (AT vehicle). The vehicle 12 according to the present embodiment is a four-wheeled vehicle. However, the vehicle 12 may be a two-wheeled vehicle, a three-wheeled vehicle, a six-wheeled vehicle, or the like.

The vehicle 12 has a plurality of electronic control units (hereinafter referred to as "ECUs") for controlling the vehicle 12. Specifically, the vehicle 12 has an engine electronic control unit (hereinafter referred to as "engine ECU 20" or ENG ECU 20), a vehicle stability assistance electronic control unit (hereinafter referred to as "VSA ECU 22"), an antilock brake system electronic control unit (hereinafter referred to as "ABS ECU 24"), a brake negative pressure electronic control unit (hereinafter referred to as "brake negative pressure ECU 26"), an electric power steering electronic control unit 28 (hereinafter referred to as "EPS ECU 28"), a battery electronic control unit (hereinafter referred to as "battery ECU 30"), a meter electronic control unit (hereinafter referred to as "meter ECU 32"), an air conditioner electronic control unit (hereinafter referred to as "air conditioner ECU 34"), a supplemental restraint system electronic control unit (hereinafter referred to as "SRS ECU 36"), and an immobilizer electronic control unit (hereinafter referred to as "immobilizer ECU 38").

(1-2-2. Engine ECU 20 and Its Periphery)

The engine ECU 20 (idling stop controller), which serves to control the output power of the engine 16, has, in addition to its engine control function, a function to control an idling stop (hereinafter also referred to as "IS") of the engine 16 based on an overall judgment made about the results that are obtained by the respective ECUs when they have judged whether the engine 16 should be stopped from idling or not depending on the states of the respective control targets of the ECUs. The engine ECU 20 also controls an alternator 40 and a starter motor 42 in addition to the engine 16 (described in detail later). When actuated by the engine 16, the alternator 40 generates electric power and supplies the generated electric energy to a 12 V battery 86 to be described later, etc. For starting the engine 16, the starter motor 42 rotates a crankshaft, not shown, to start the engine 16.

The engine ECU 20 is supplied with output signals from a coolant temperature sensor 44, an accelerator pedal sensor 46, a brake pedal sensor 48, a clutch pedal sensor 50, a shift position sensor 52, a vehicle speed sensor 54, and an idling stop controller turn-off switch 56 (hereinafter referred to as "IS off SW 56").

The coolant temperature sensor 44 detects the temperature of the coolant of the engine 16 (hereinafter referred to as "engine coolant temperature Tw"). The accelerator pedal sensor 46 detects an operated amount of an accelerator pedal 58 (hereinafter referred to as "accelerator operated amount θap"). The brake pedal sensor 48 detects an operated amount of a brake pedal 60 (hereinafter referred to as "brake operated amount θbp"). The clutch pedal sensor 50 detects an operated amount of a clutch pedal (hereinafter referred to as "clutch operated amount θcp"). The shift position sensor 52 detects an operated position of a shift lever 64 (hereinafter referred to as "shift position Ps"). The vehicle speed sensor 54 detects a vehicle speed V of the vehicle 12.

The IS off SW 56 is a switch for setting whether an automatic idling stop control function is to be activated or not, and is located in a position operable by the driver of the vehicle 12. When the IS off SW 56 is turned off, the engine ECU 20 is capable of automatically stopping the engine 16 from idling. When the IS off SW 56 is turned on, the automatic idling stop control function is inactivated, and the engine ECU 20 is inhibited from stopping the engine 16 from idling.

Figure 6:
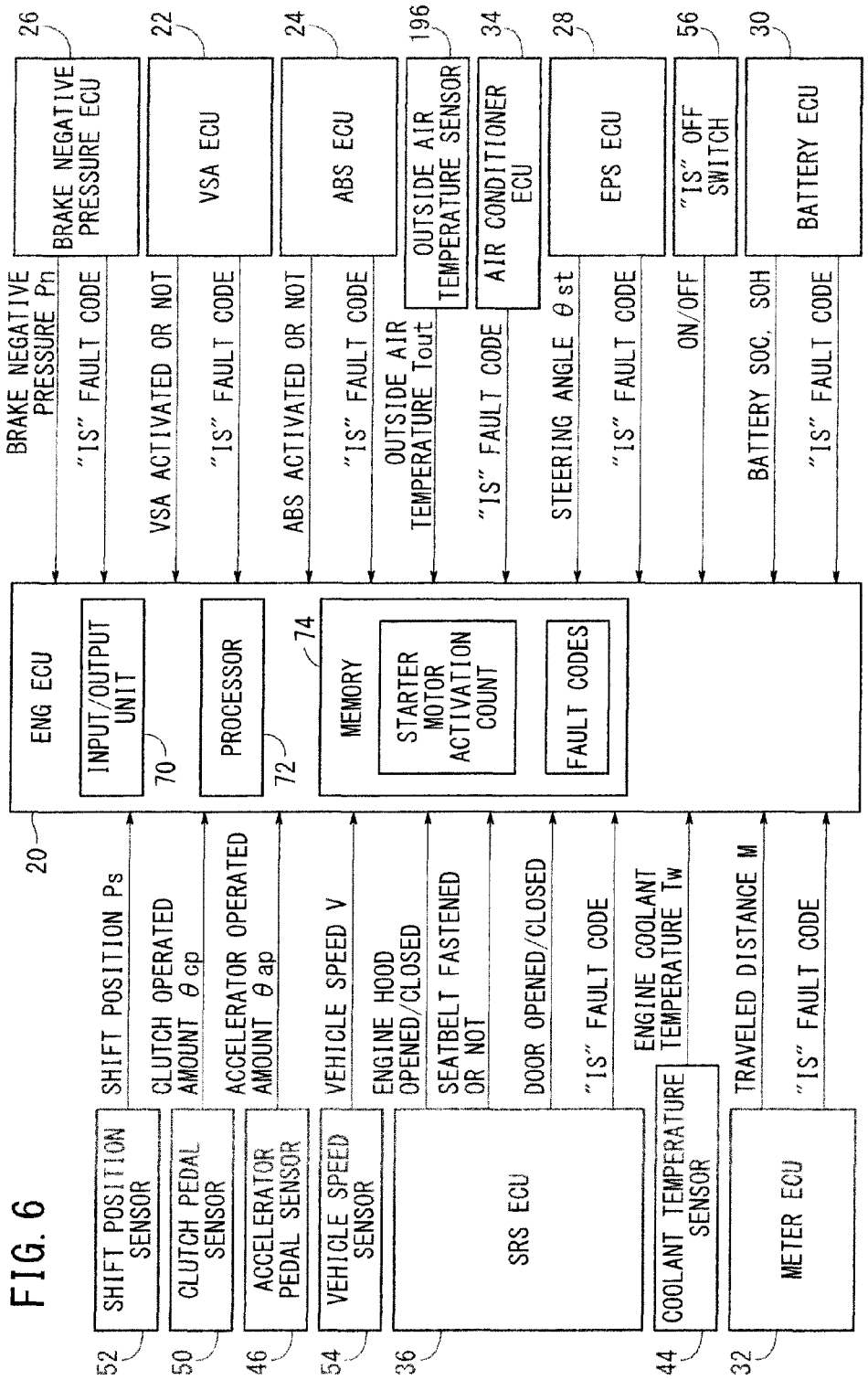
FIG. 6 is a diagram illustrating information that is supplied to the engine ECU for the engine ECU to judge IS preconditions and idling stop permitting conditions (hereinafter referred to as "IS permitting conditions")

As shown in FIG. 6, the engine ECU 20 has an input/output unit 70, a processor 72, and a memory 74. Although not shown, each of the other ECUs also has an input/output unit, a processor, and a memory.

(1-2-3. VSA ECU 22 and ABS ECU 24)

The VSA ECU 22 serves to perform a vehicle stability assistance (vehicle stability assist) control process. The VSA ECU 22 controls a brake system, etc., not shown, to stabilize the behavior of the vehicle 12 when the vehicle 12 turns along a curved road or the like.

The ABS ECU 24 serves to perform an antilock braking control process. The ABS ECU 24 controls the brake system, etc. to prevent the road wheels, not shown, of the vehicle 12 from being locked when the vehicle 12 is braked.

(1-2-4. Brake Negative Pressure ECU 26)

The brake negative pressure ECU 26 controls the negative pressure of the brake system based on a brake negative pressure Pn detected by a negative pressure sensor 80. The brake negative pressure Pn will hereinafter be described as having a positive value.

(1-2-5. EPS ECU 28 and Its Periphery)

The EPS ECU 28 serves to perform a steering assistance control process. The EPS ECU 28 controls the components (an electric motor and a torque sensor, both not shown, a steering angle sensor 82, etc.) of an electric power steering apparatus to assist the driver in steering the vehicle 12. The steering angle sensor 82 detects a steering angle θst of a steering wheel 84.

(1-2-6. Battery ECU 30 and its Periphery)

The battery ECU 30 controls the charging and discharging, etc. of the 12 V battery 86 (hereinafter also referred to as "battery 86" or "12 V BAT 86"). The 12 V battery 86 supplies electric power to the various electric components (the ECUs, the sensors, an air conditioner 180, etc.) of the vehicle 12 through electric power cables, not shown.

(1-2-7. Meter ECU 32 and its Periphery)

Figure 2:
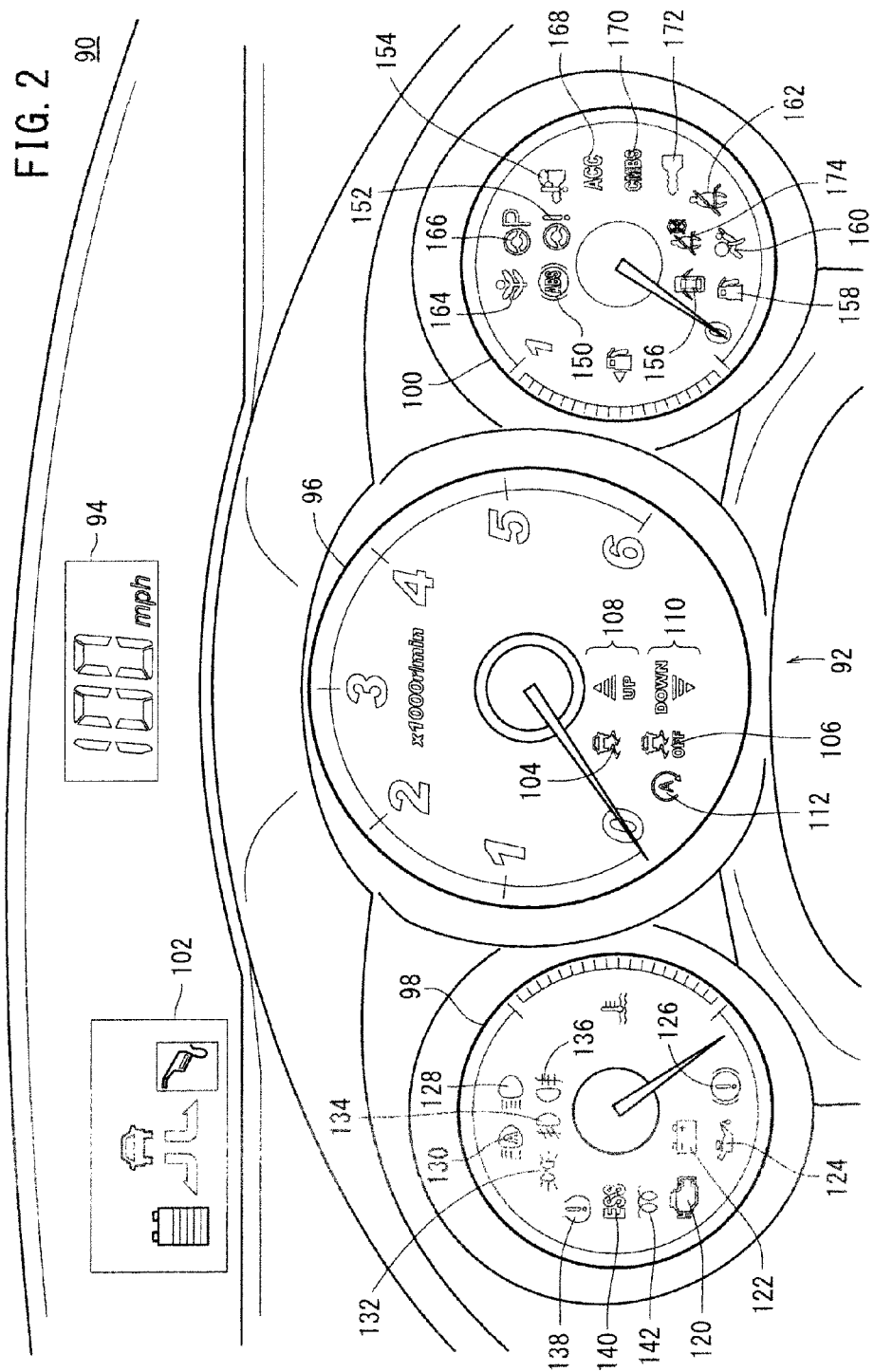
FIG. 2 is a view of a meter display device.

The meter ECU 32 controls a meter display device 92 on an instrument panel 90 (see FIG. 2).

FIG. 2 is a view of the meter display device 92. As shown in FIG. 2, the meter display device 92 has first through fifth display units 94, 96, 98, 100, 102. The first display unit 94 displays a vehicle speed V in a digital presentation. The second display unit 96 displays an engine rotational speed [rpm] and has a plurality of warning lamps 104, 106 and a plurality of indicator lamps 108, 110, 112.

The warning lamp 104, which is a VSA warning lamp, blinks when a VSA function is working and is lighted when the VSA function suffers a fault, or stated otherwise, when a fault occurs within a target range that is controlled by the VSA ECU 22. The warning lamp 106 is a VSA off warning lamp that is lighted when the VSA function is turned off by an operating switch, not shown.

The indicator lamp 108 is a shift-up indicator lamp that is lighted when a shift-up operation is recommended. The indicator lamp 110 is a shift-down indicator lamp that is lighted when a shift-down operation is recommended.

The indicator lamp 112 is an idling stop indicator lamp (hereinafter referred to as "IS indicator lamp 112") for indicating whether an IS control process is being carried out or not. According to the present embodiment, the IS indicator lamp 112 is lighted or blinks and changes its light emission colors depending on how the IS control process is carried out, as described in detail later with reference to FIGS. 9 and 10, etc.

According to the present embodiment, a "warning lamp" is provided to give a warning, e.g., for prompting the driver to inspect a fault or repair the vehicle 12 or take a certain action, in the event of a fault occurring in the vehicle 12, and is associated with a specific ECU, sensor, or switch. The "warning lamp" is also used to give a warning about the occurrence of a significant fault that is directly related to a failure (system failure) tending to make the entire target range controlled by each ECU fail to function. Therefore, anyone who sees a warning lamp that is lighted, they can understand which ECU, sensor, or switch is involved in the warning for prompting them to inspect a fault or repair the vehicle 12 or take a certain action.

If a "warning lamp" is related to a failure or fault in the vehicle 12, then once such a failure or fault occurs, the warning lamp continues to operate, i.e., to be lighted or to blink until the failure or fault is eliminated. The warning lamp is de-energized when an ignition switch, not shown, of the vehicle 12 is turned off, but starts to continue operating again when the ignition switch is turned on.

According to the present embodiment, an "indicator lamp" is provided to indicate a certain content without giving a warning from a warning lamp. For example, an "indicator lamp" is used to indicate other events than a warning about the occurrence of a significant fault that is directly related to a system failure, e.g., the occurrence of a relatively minor fault that is not directly related to a system failure.

The third display unit 98 displays an engine coolant temperature Tw and has a plurality of warning lamps 120, 122, 124, 126 and a plurality of indicator lamps 128, 130, 132, 134, 136, 138, 140, 142.

The warning lamp 120 is a PGM-FI warning lamp (engine warning lamp) that is lighted or blinks when a fault is occurring in relation to the engine 16, or stated otherwise, when a fault is occurring within a target range controlled by the engine ECU 20. The warning lamp 122 is a charge warning lamp that is lighted when the 12 V battery 86 is not charged enough and is also lighted when a fault is occurring in relation to the 12 V battery 86, or stated otherwise, when a fault is occurring within a target range controlled by the battery ECU 30.

The warning lamp 124 is an oil pressure warning lamp that is lighted when the pressure of the engine oil drops and is also lighted when a fault is occurring in relation to the pressure of the engine oil, or stated otherwise, when a fault is occurring within a target range controlled by an oil pressure control ECU, not shown, while the engine 16 is in operation.

The warning lamp 126 is a brake warning lamp that is lighted when a parking brake, not shown, is applied and is also lighted when a fault is occurring in relation to the brake system, or stated otherwise, when a fault is occurring within a target range controlled by a brake ECU, not shown.

The indicator lamp 128 is a high-beam indicator lamp which is lighted when a head light, not shown, is directed upwardly. The indicator lamp 132 is a light turn-on indicator lamp that is lighted unless a light switch, not shown, is turned off. The indicator lamp 134 is a fog light turn-on indicator lamp that is lighted when a fog light, not shown, is turned on.

The fourth display unit 100 indicates a remaining level of fuel and has a plurality of warning lamps 150, 152, 154, 156, 158, 160, 162 and a plurality of indicator lamps 164, 166, 168, 170, 172, 174.

The warning lamp 150 is an ABS warning lamp that is lighted when an ABS function is suffering a fault, or stated otherwise, a fault is occurring within a target range controlled by the ABS ECU 24. The warning lamp 152 is an EPS warning lamp that is lighted when the electric power steering apparatus, not shown, is suffering a fault, or stated otherwise, when a fault is occurring within a target range controlled by the EPS ECU 28. The warning lamp 154 is a smart key system warning lamp that is lighted when a smart key system, not shown, is suffering a fault, or stated otherwise, when a fault is occurring within part of a target range controlled by the immobilizer ECU 38. The warning lamp 156 is a door opening and closing warning lamp that is lighted when a door 192 (FIG. 1) is not completely closed.

The warning lamp 158 is a remaining fuel level warning lamp that is lighted when the remaining level of fuel is low and is also lighted when a fuel meter is suffering a fault. The warning lamp 160 is an airbag system warning lamp that is lighted when an airbag system, not shown, or a pretensioner system, not shown, is suffering a fault, or stated otherwise, when a fault is occurring within part of a target range controlled by the SRS ECU 36. The warning lamp 162 is a seatbelt unfastened warning lamp that is lighted when the driver has not fastened a seatbelt 190 and is also lighted when a fault is occurring in relation to the seatbelt 190, stated otherwise, when a fault is occurring within part of the target range controlled by the SRS ECU 36.

The indicator lamp 164 is an economy mode indicator lamp that is lighted when an economy mode is selected as a drive mode of the vehicle 12 by a switch, not shown. The indicator lamp 172 is an immobilizer system indicator lamp that blinks when the immobilizer ECU 38 is unable to recognize key information.

The indicator lamp 174 is a side airbag automatic shutdown indicator lamp that is lighted when a sensor, not shown, of a side airbag system on a front passenger seat is operated and the side airbag system is automatically shut down.

The fifth display unit 102, which comprises a so-called multi-information display (MID) having a display panel such as a liquid crystal panel or an organic EL panel, is capable of displaying various items of information such as messages, etc. depending on commands from the meter ECU 32.

(1-2-8. Air Conditioner ECU 34 and its Periphery)

The air conditioner ECU 34 (FIG. 1) controls the air conditioner 180.

(1-2-9. SRS ECU 36 and its Periphery)

The SRS ECU 36 controls the airbag system, not shown. The SRS ECU 36 is supplied with output signals from an engine hood sensor 182, a seatbelt sensor 184, and a door sensor 186. The engine hood sensor 182 detects whether an engine hood 188 is closed or opened. The seatbelt sensor 184 detects whether the seatbelt 190 is fastened or not. The door sensor 186 detects whether the door 192 is opened or closed.

(1-2-10. Immobilizer ECU 38 and its Periphery)

The immobilizer ECU 38 controls an immobilizer system, not shown, and the smart key system, not shown.

(1-3. External Diagnosing Apparatus 14)

The external diagnosing apparatus 14 can perform various diagnoses (including a fault diagnosis) on the vehicle 12. As shown in FIG. 1, the external diagnosing apparatus 14 has a communication cable 200, an input/output unit 202, an operating unit 204, a processor 206, a memory 208, and a display unit 210.

The communication cable 200 is connected to a data link connector 194 of the vehicle 12 for communication with the vehicle 12. The communication cable 200 may be replaced with a wireless communication function. The input/output unit 202 is used not only for communication with the vehicle 12, but also for sending data to and receiving data from other external devices, e.g., an external server. The operating unit 204 includes a keyboard, a mouse, a touch pad, etc., not shown.

The processor 206 performs various control processes for diagnosing the vehicle 12. The memory 208 stores programs and data to be executed and used by the processor 206, and comprises a nonvolatile memory and a volatile memory. The display unit 210 displays operating screens and diagnostic results of the external diagnosing apparatus 14.

The external diagnosing apparatus 14 may comprise a laptop personal computer, a tablet computer, or a smart phone that is commercially available, for example. The external diagnosing apparatus 14 may not necessarily be in the form of a single unit, but may be a combination of a personal computer as a main unit and a slave unit (tester) as an interface with the vehicle 12.

[2. Control Process in Relation to Idling Stop of the Vehicle 12]

(2-1. Normal Flow Overview)

Figure 3:
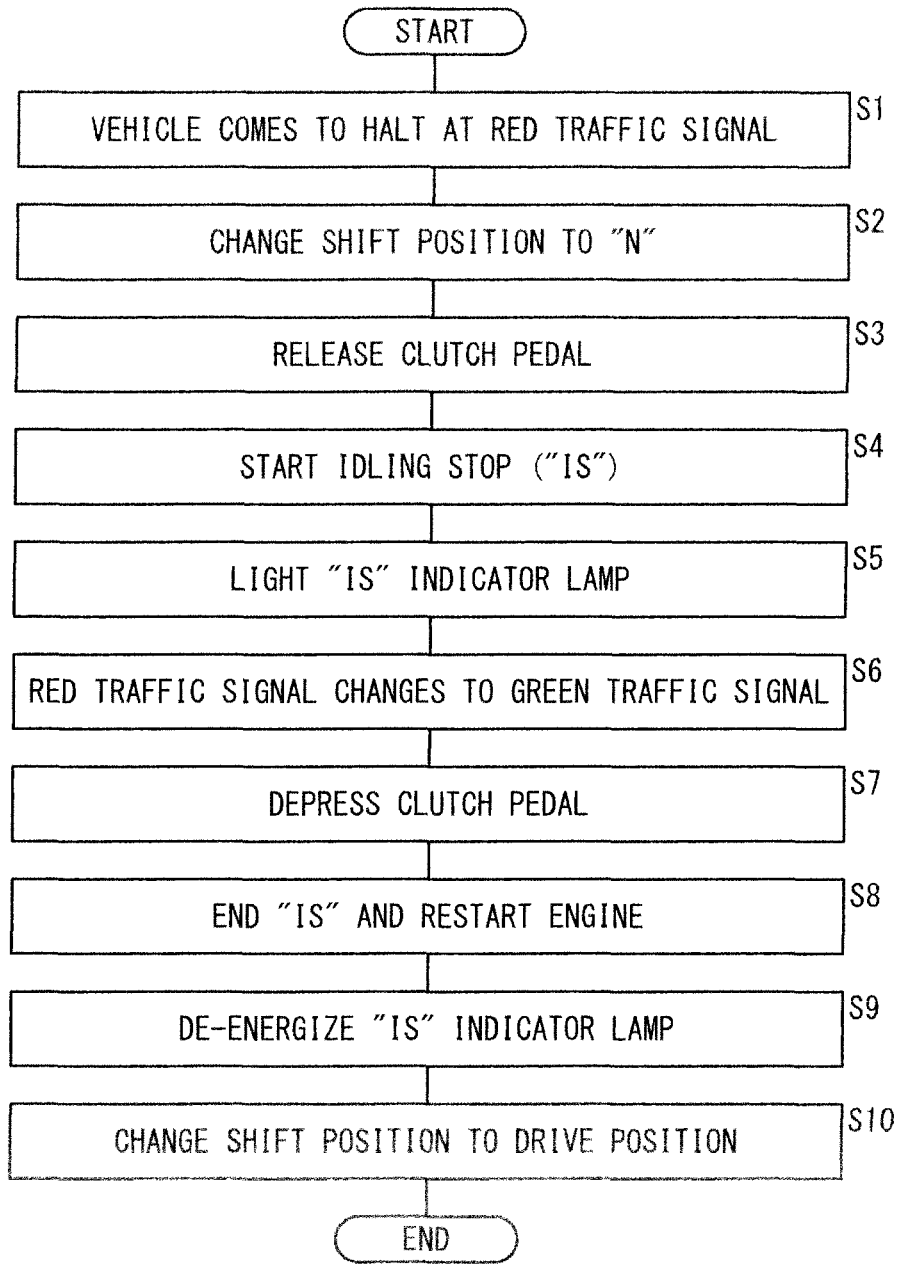
FIG. 3 is a flowchart of a normal processing sequence followed when the engine of a vehicle is automatically stopped from idling at the time the vehicle comes to a halt.

FIG. 3 is a flowchart of a normal processing sequence followed when the engine of the vehicle 12 is automatically stopped from idling at the time the vehicle 12 comes to a halt. When the vehicle 12 comes to a halt at a red traffic signal (step S1), the driver depresses the clutch pedal 62 and then changes the shift position Ps to a neutral position "N" (step S2). Thereafter, the driver releases the clutch pedal 62 (step S3). The engine 16 is now automatically stopped from idling (step S4), and the IS indicator lamp 112 of the meter display device 92 is lighted in green, indicating that the engine 16 is being stopped from idling (step S5).

When the red traffic signal changes from a red traffic signal to a green traffic signal (step S6), the driver depresses the clutch pedal 62 (step S7). The engine is no longer stopped from idling, but is restarted by the starter motor 42 that has been automatically activated (step S8). The IS indicator lamp 112 is turned off, indicating that the engine 16 is not stopped from idling (step S9). The driver moves the shift lever 64 to bring the shift position Ps to a drive position, e.g., a first speed position, causing the vehicle 12 to start moving (step S10).

(2-2. Idling Stop Control Process of the Engine ECU 20)

(2-2-1. Overall Flow)

A control process, i.e., an idling stop control process, carried out by the engine ECU 20 during the flow shown in FIG. 3 will be described below.

Figure 4:
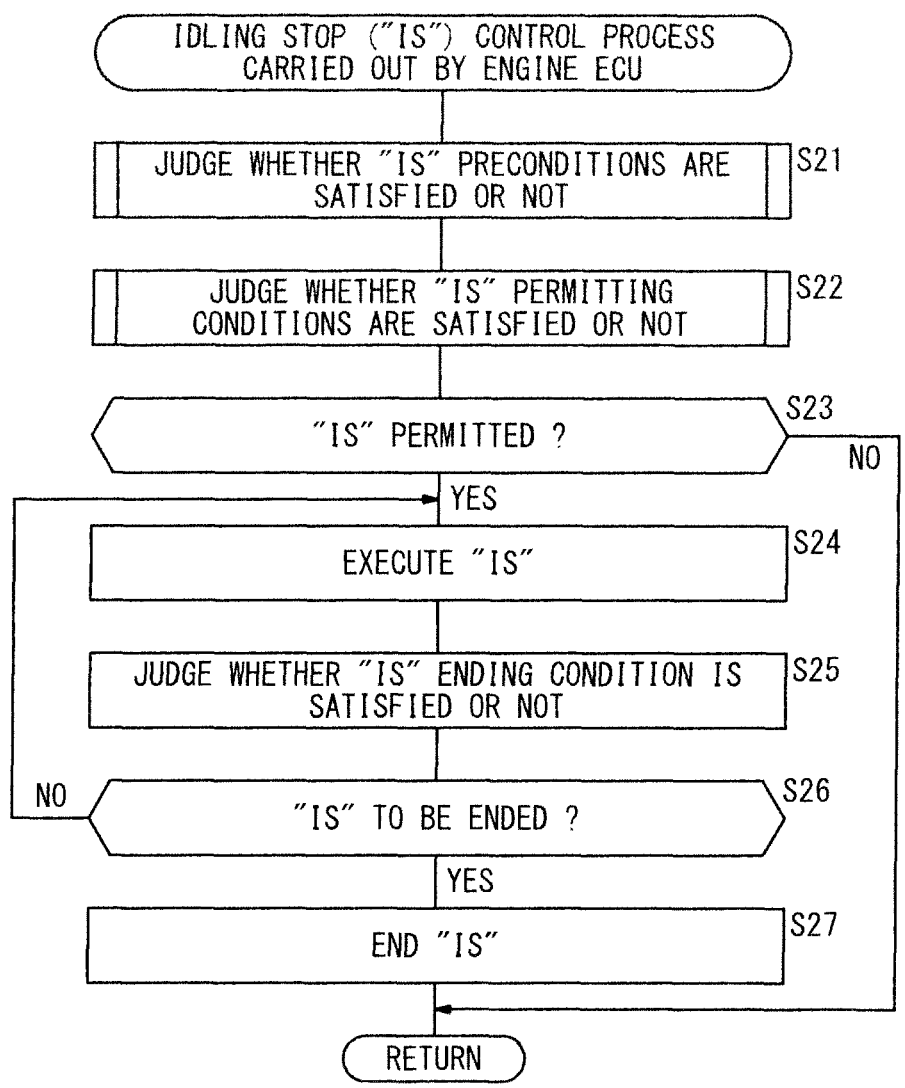
FIG. 4 is a flowchart of an idling stop control process carried out by an engine electronic control unit (hereinafter referred to as "engine ECU")

FIG. 4 is a flowchart of an idling stop control process carried out by the engine ECU 20. In step S21, the engine ECU 20 judges whether a precondition for stopping the engine 16 from idling (hereinafter referred to as "IS precondition") is satisfied or not.

The IS precondition is satisfied when the shift lever 64 is moved to the neutral position (S2 in FIG. 3) and the clutch pedal 62 is released, or stated otherwise, the clutch operated amount θcp becomes equal to or smaller than a predetermined value (S3 in FIG. 3), for example. In addition or alternatively, the IS precondition may be satisfied when another action is taken by the driver, e.g., at least one of the conditions where the accelerator pedal 58 is released, or stated otherwise, the accelerator operated amount θap becomes equal to or smaller than a predetermined value, and where the brake pedal 60 is depressed, or stated otherwise, the brake operated amount θbp becomes equal to or greater than a predetermined value, and where the vehicle 12 is traveling in a certain running state, e.g., when the vehicle speed V is equal to or smaller than a predetermined value.

In other words, the IS precondition may include at least one condition that serves as a basis for stopping the engine 16 from idling, i.e., a condition for judging a situation where the engine 16 is expected to stop idling or a situation suitable for stopping the engine 16 from idling. Such a condition includes a condition that can be recognized by the driver for driving the vehicle 12.

Details of step S21 according to the present embodiment will be described later with reference to FIG. 5.

In step S22, the engine ECU 20 judges whether an idling stop permitting condition (hereinafter referred to as "IS permitting condition") is satisfied or not. Whereas the IS precondition is a precondition for stopping the engine 16 from idling, e.g., at least one of an action taken by the driver and a running state of the vehicle 12, the IS permitting condition is a condition for not permitting the engine 16 to stop idling even if the precondition for stopping the engine 16 from idling is satisfied, e.g., a condition about the occurrence of a failure or an excessive deterioration of any component related to the idling stop of the engine 16 (hereinafter referred to as "idling stop-related component"). Details of step S22 will be described later with reference to FIG. 7.

In step S23, the engine ECU 20 judges whether the engine 16 is permitted to stop idling or not based on the judgment results from steps S21, S22. Specifically, if the IS precondition and the IS permitting conditions are satisfied, then the engine ECU 20 judges that the engine 16 is permitted to stop idling, and if the IS precondition or the IS permitting conditions is not satisfied, then the engine ECU 20 judges that the engine 16 is not permitted to stop idling.

If the engine 16 is not permitted to stop idling (S23: NO), then the engine ECU 20 ends the processing sequence of the present processing cycle, and starts the processing sequence of a next processing cycle from step S21.

If the engine 16 is permitted to stop idling (S23: YES), then the engine ECU 20 carries out the idling stop control process, shutting down the engine 16 in step S24.

In step S25, the engine ECU 20 judges a condition for ending the idling stop control process and restarting the engine 16 (hereinafter referred to as "IS ending condition"). The IS ending condition is satisfied when the clutch pedal 62 is depressed, or stated otherwise, the clutch operated amount θcp becomes equal to or greater than a predetermined value (S7 in FIG. 3), for example. In addition or alternatively, the IS ending condition may be satisfied when another action is taken by the driver, e.g., at least one of the conditions where the brake pedal 60 is released, or stated otherwise, the brake operated amount θbp becomes equal to or smaller than a predetermined value, and where the accelerator pedal 58 is depressed, or stated otherwise, the accelerator operated amount θap becomes equal to or greater than a predetermined value.

In step S26, the engine ECU 20 judges whether or not the engine 16 is to end its idling stop based on the judgment result from step S25. Specifically, if the IS ending condition is satisfied, then the engine ECU 20 judges that the engine 16 is to end its idling stop, and if the IS ending condition is not satisfied, then the engine ECU 20 judges that the engine 16 is not to end its idling stop.

If the engine 16 is not to end its idling stop (S26: NO), then control goes back to step S24, keeping the engine 16 stopped from idling. If the engine 16 is to end its idling stop (S26: YES), then the engine ECU 20 energizes the starter motor 42 to restart the engine 16 in step S27.

(2-2-2. Judging IS Preconditions)

Figure 5:
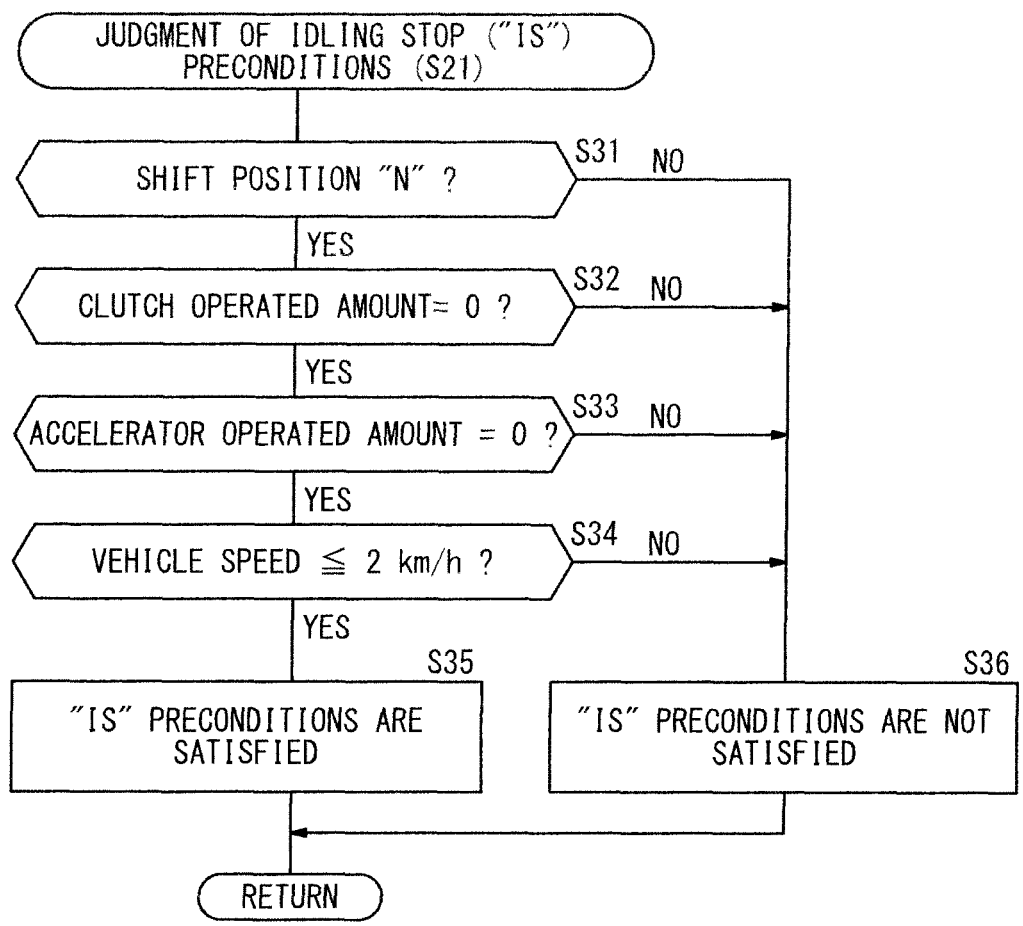
FIG. 5 is a flowchart of a process (details of S21 in FIG. 4) carried out by the engine ECU for judging idling stop preconditions (hereinafter referred to as "IS preconditions")

FIG. 5 is a flowchart of a process (details of S21 in FIG. 4) carried out by the engine ECU 20 for judging IS preconditions. FIG. 6 is a diagram illustrating information that is supplied to the engine ECU 20 for the engine ECU 20 to judge IS preconditions and IS permitting conditions.

In step S31 shown in FIG. 5, the engine ECU 20 judges whether the shift position Ps is "N" (neutral) or not based on an output signal from the shift position sensor 52.

If the shift position Ps is "N" (S31: YES), then the engine ECU 20 judges whether the clutch operated amount θcp of the clutch pedal 62 is zero or not, or stated otherwise, whether the clutch pedal 62 is released or not, based on an output signal from the clutch pedal sensor 50 in step S32. The engine ECU 20 may use another threshold value than zero insofar as it is effective to judge that the clutch pedal 62 is released.

If the clutch operated amount θcp is zero (S32: YES), then the engine ECU 20 judges whether the accelerator operated amount θap of the accelerator pedal 58 is zero or not, or stated otherwise, whether the accelerator pedal 58 is released or not, based on an output signal from the accelerator pedal sensor 46 in step S33. The engine ECU 20 may use another threshold value than zero insofar as it is effective to judge that the accelerator pedal 58 is released.

If the accelerator operated amount θap is zero (S33: YES), then the engine ECU 20 judges whether or not the vehicle speed V is equal to or lower than 2 km/h, or stated otherwise, whether the vehicle speed V is of a value suitable for stopping the engine 16 from idling or not, based on an output signal from the vehicle speed sensor 54 in step S34. The engine ECU 20 may use another threshold value than 2 km/h insofar as it is effective to judge whether the vehicle speed V is of a value suitable for stopping the engine 16 from idling or not.

If the vehicle speed V is equal to or lower than 2 km/h (S34: YES), then the engine ECU 20 judges that the IS preconditions are satisfied in step S35. According to the present embodiment, as described above, not only all IS preconditions but also all IS permitting conditions need to be satisfied in order to start the idling stop control process.

If the answer to any one of steps S31 through S34 is NO, then the engine ECU 20 judges that the IS preconditions are not satisfied, i.e., the idling stop control process cannot be started, in step S36.

(2-2-3. Judging IS Permitting Conditions)

FIG. 7 is a flowchart of a process (details of S22 in FIG. 4) carried out by the engine ECU 20 for judging IS permitting conditions. In step S41, the engine ECU 20 judges whether the engine hood 188 is closed or not based on an output signal from the engine hood sensor 182 or the SRS ECU 36.

If the engine hood 188 is closed (S41: YES), then the engine ECU 20 judges whether the seatbelt 190 on the driver seat is fastened or not based on an output signal from the seatbelt sensor 184 or the SRS ECU 36 in step S42.

If the seatbelt 190 is fastened (S42: YES), then the engine ECU 20 judges whether the door 192 next to the driver seat is closed or not based on an output signal from the door sensor 186 or the SRS ECU 36 in step S43.

If the door 192 is closed (S43: YES), then the engine ECU 20 judges whether the engine 16 has been warmed up or not in step S44. Specifically, the engine ECU 20 judges whether or not the engine coolant temperature Tw is equal to or greater than a predetermined value, i.e., a coolant temperature threshold value THtw, and the distance M that the vehicle 12 has traveled after having started is equal to or greater than a predetermined value, i.e., a distance threshold value THm. The engine coolant temperature Tw is represented by an output signal from the coolant temperature sensor 44, and the traveled distance M is acquired from the meter ECU 32.

If the engine 16 has been warmed up (S44: YES), then the engine ECU 20 judges whether the brake negative pressure Pn is sufficient or not in step S45. Specifically, the engine ECU 20 judges whether or not the brake negative pressure Pn is equal to or greater than a predetermined value, i.e., a negative pressure threshold value THpn, based on an output signal from the negative pressure sensor 80. Since the brake negative pressure Pn is processed as a positive value, as described above, the greater the brake negative pressure Pn, the more effective it is to brake the vehicle 12.

If the brake negative pressure Pn is sufficient (S45: YES), then the engine ECU 20 judges whether the VSA function and the ABS function are shut down or not, thereby judging whether the vehicle 12 is under posture control or not, in step S46. The engine ECU 20 uses output signals from the VSA ECU 22 and the ABS ECU 24 for the judgment.

If the VSA function and the ABS function are shut down (S46: YES), then the engine ECU 20 judges whether the air conditioner 180 requires no excessively large electric power or not in step S47. Specifically, while the air conditioner 180 is in operation, the engine ECU 20 judges whether an outside air temperature Tout falls within a predetermined range or not.

The predetermined range refers to a range for judging whether the outside air temperature Tout is not an extremely low temperature or an extremely high temperature. Stated otherwise, if the outside air temperature Tout does not fall within the predetermined range, then the load on the air conditioner 180 is necessarily large because it is cold or hot outside the vehicle 12, requiring the engine 16 to operate the alternator 40. The outside air temperature Tout is represented by an output signal from an outside air temperature sensor 196 (FIG. 1).

If the air conditioner 180 requires no excessively large electric power (S47: YES), then the engine ECU 20 judges whether or not the vehicle 12 is not being steered, thereby confirming that the vehicle 12 is not in a steered posture intending to start immediately while being stopped at an intersection or the like, in step S48. The engine ECU 20 uses an output signal (steering angle θst) from the steering angle sensor 82.

If the vehicle 12 is not being steered (S48: YES), then the engine ECU 20 judges whether the IS off SW 56 is turned off or not in step S49. As described above, if the IS off SW 56 is turned on, the idling stop control function in the engine ECU 20 is inactivated.

If the IS off SW 56 is turned off (S49: YES), then the engine ECU 20 judges whether the remaining energy level (SOC: State Of Charge) of the 12 V battery 86 is sufficient or not in step S50. Specifically, the engine ECU 20 judges whether or not the SOC acquired from the battery ECU 30 is equal to or greater than a predetermined threshold value (hereinafter referred to as "first battery threshold value THsoc" or "threshold value THsoc").

The SOC is calculated by multiplying the remaining energy level at present divided by the fully charged energy level by 100 {SOC=(remaining energy level at present/fully charged energy level)×100}. The engine ECU 20 can judge in step S50 whether the voltage drop that occurs across the 12 V battery 86 when the starter motor 42 is energized is lower than a predetermined value or not. If the SOC is equal to or higher than the threshold value THsoc (S50: YES), then the need for the engine 16 to operate the alternator 40 to charge the 12 V battery 86 is low.

If the SOC of the 12 V battery 86 is sufficient (S50: YES), then the engine ECU 20 judges whether or not the number Ns of times that the starter motor 42 has been activated, i.e., an activation count Ns, is equal to or smaller than a predetermined value in step S51. Specifically, the engine ECU 20 judges whether or not the activation count Ns of the starter motor 42 is equal to or smaller than a predetermined threshold value (hereinafter referred to as "activation count threshold value THns" or "threshold value THns"). The threshold value THns is a value for judging whether the activation count Ns is excessive for the starter motor 42 and the starter motor 42 needs to be replaced or not. If the activation count Ns is equal to or smaller than the threshold value THns (S51: YES), then there is no need to avoid the idling stop in view of a deterioration of the starter motor 42. The activation count Ns of the starter motor 42 is counted by the engine ECU 20 and stored in the memory 74 (FIG. 6).

If the activation count Ns of the starter motor is equal to or smaller than the predetermined value, i.e., the threshold value THns (S51: YES), then the engine ECU 20 judges whether a fault that inhibits an idling stop has occurred or not in step S52. Specifically, the engine ECU 20 communicates with each of the ECUs that control respective target ranges including components which may possibly suffer faults that inhibit an idling stop (hereinafter referred to as "IS inhibiting faults"), and confirms whether an IS inhibiting fault has occurred in the target range controlled by any of the ECUs or not.

If a fault, which may be an IS inhibiting fault or another fault, has occurred in the target range controlled by each ECU, then the ECU stores a fault code in its own memory, e.g., the engine ECU 20 stores a fault code in the memory 74. The fault code will be used when a fault diagnosis is performed by the external diagnosing apparatus 14 as described in detail later.

According to the present embodiment, the fault codes include IS fault codes and fault codes that are not defined as inhibiting an idle stop (hereinafter referred to as "non-IS fault code"). The IS fault codes include IS fault codes (hereinafter referred to as "first IS fault codes") corresponding to relatively serious faults that result in the lighting of warning lamps assigned to the individual ECUs, e.g., the PGM-FI warning lamp 120, the charging warning lamp 122, etc. shown in FIG. 2, and IS fault codes (hereinafter referred to as "second IS fault codes") corresponding to relatively minor faults that result in the lighting of only the common indicator lamp 112, not the warning lamps assigned to the individual ECUs.

The non-IS fault codes correspond to relatively minor faults that do not result in the lighting of the warning lamps and the indicator lamps. The non-IS fault codes are read and used in fault diagnoses by the external diagnosing apparatus 14 that is connected to the vehicle 12.

FIG. 8 is a diagram showing examples of faults corresponding to first IS fault codes, second IS fault codes, and non-IS fault codes. As shown in FIG. 8, even if one faulty component, e.g., the 12 V battery 86, is involved, a fault corresponding to a first IS fault code, e.g., a fault code CCCC in FIG. 8: a fault of the alternator 40, causes the charging warning lamp 122 (FIG. 2) to be lighted, and a fault corresponding to a second IS fault code, e.g., a fault code FFFF in FIG. 8: a fault of a battery voltage sensor, causes the IS indicator lamp 112 to be lighted. If the engine 16 is a faulty component, then a fault corresponding to a first IS fault code, e.g., a fault code AAAA in FIG. 8: a high engine coolant temperature Tw, causes the PGM-FI warning lamp 120 to be lighted, and a fault corresponding to a second IS fault code, e.g., a fault code EEEE in FIG. 8: a high detected sensor voltage, causes the IS indicator lamp 112 to be lighted.

Faults corresponding to the non-IS fault codes do not cause either the warning lamps or the indicator lamps to be lighted.

According to the present embodiment, when each ECU detects a fault in a target range controlled by itself, it records the fault code in its own memory, e.g., the engine ECU 20 records the fault code in the memory 74.

According to the present embodiment, the engine ECU 20, the VSA ECU 22, the ABS ECU 24, the brake negative pressure ECU 26, the EPS ECU 28, the battery ECU 30, the meter ECU 32, the air conditioner ECU 34, and the SRS ECU are established as ECUs that possibly record IS fault codes. The immobilizer ECU 38, however, is not established as an ECU that possibly records IS fault codes.

Referring back to step S52 in FIG. 7, if a fault that inhibits an idling stop has not occurred (S52: YES), then the engine ECU 20 judges that the IS permitting conditions are satisfied in step S53. According to the present embodiment, as described above, it is necessary to satisfy not only all IS permitting conditions but also all IS preconditions in order to start the idling stop control process.

If even any one of the answers to steps S41 through S52 is NO, then the engine ECU 20 judges that the IS permitting conditions are not satisfied, i.e., the idling stop control process cannot be started, in step S54.

(2-3. Idling Stop-Related Display Control Process Carried Out by the Engine ECU 20)
(2-3-1. Overall Flow)

A process carried out by the engine ECU 20 to change displayed information on the meter display device 92 through the meter ECU 32, i.e., an idling stop-related display control process, during the processing sequence shown in FIG. 3, will be described below.

Figure 9:
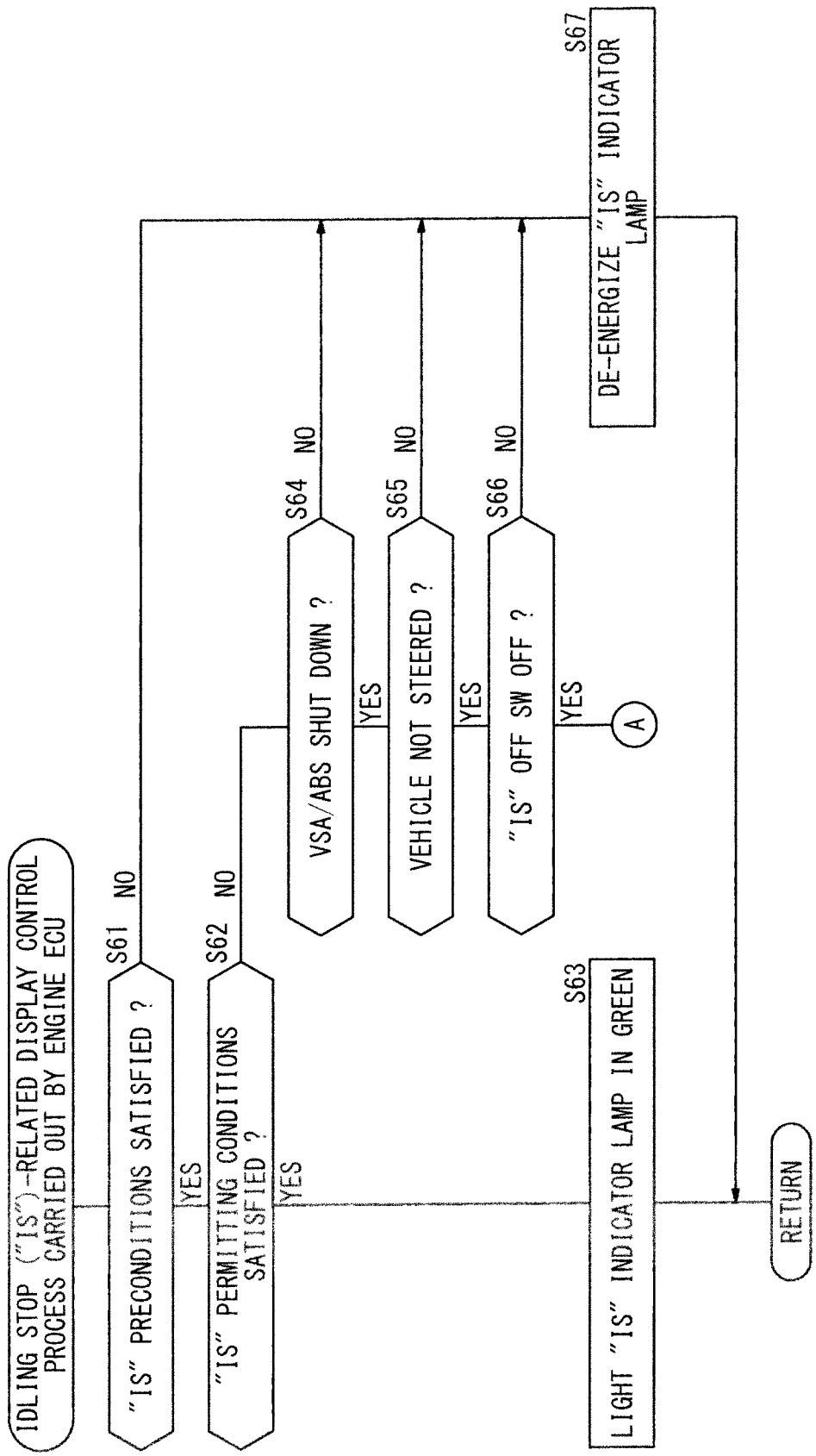
FIG. 9 is a first flowchart of an idling stop-related display control process carried out by the engine ECU.
Figure 10:
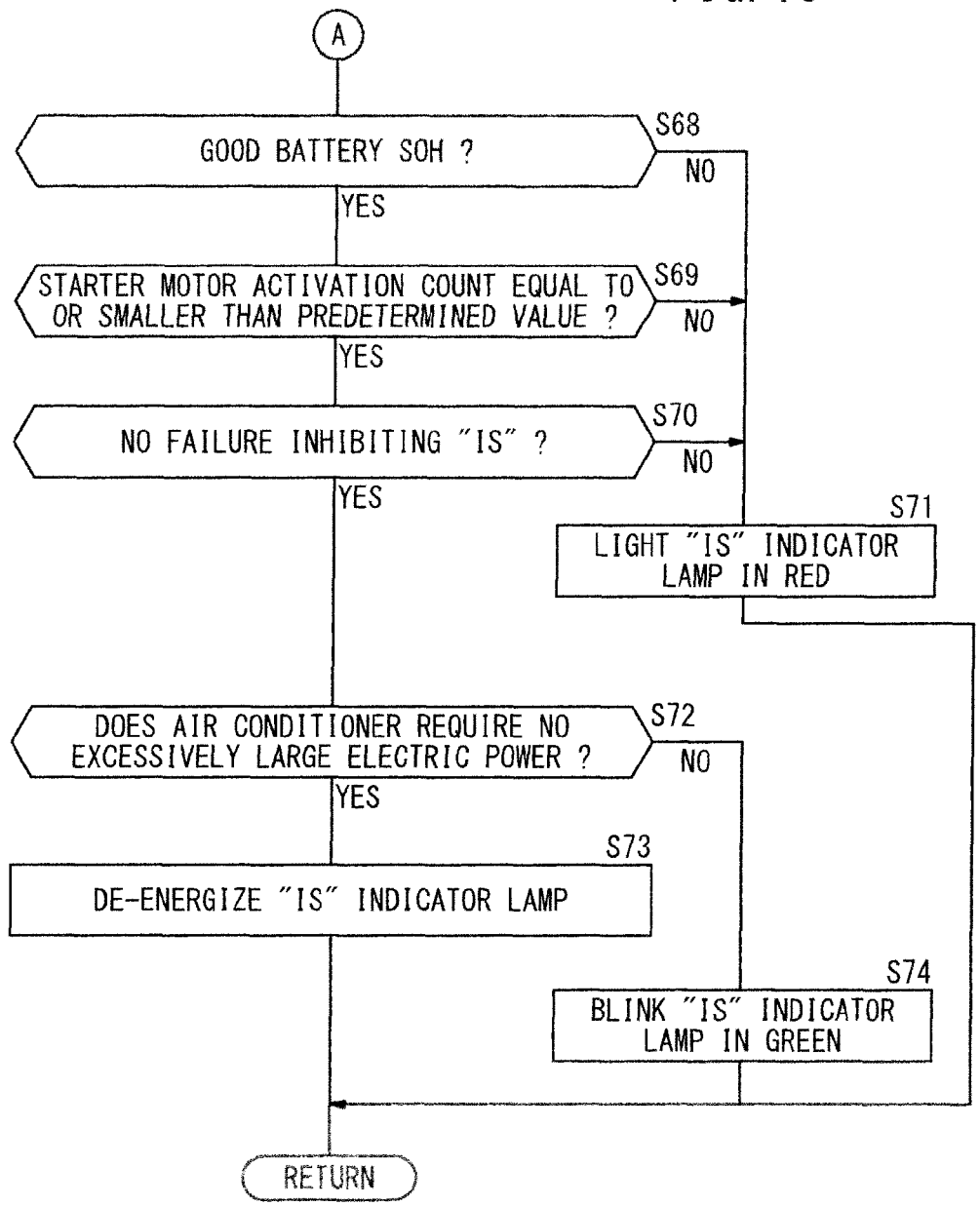
FIG. 10 is a second flowchart of the idling stop-related display control process carried out by the engine ECU.

FIGS. 9 and 10 are first and second flowcharts, respectively, of an idling stop-related display control process carried out by the engine ECU 20. In step S61 shown in FIG. 9, the engine ECU 20 judges whether the above idling stop (IS) preconditions (see FIG. 5) are satisfied or not. If the IS preconditions are satisfied (S61: YES), then the engine ECU 20 judges whether the above idling stop (IS) permitting conditions (see FIG. 7) are satisfied or not in step S62.

If the IS permitting conditions are satisfied (S62: YES), then the engine 16 is normally stopped from idling. In step S63, the engine ECU 20 controls the meter ECU 32 to light the IS indicator lamp 112 (FIG. 2) in green in order to indicate to the driver that the engine 16 is stopped from idling. Other information may be displayed insofar as it indicates to the driver that the engine 16 is stopped from idling.

In step S62, if the IS permitting conditions are not satisfied (S62: NO), then the engine ECU 20 judges whether the VSA function and the ABS function are shut down or not, thereby judging whether the vehicle 12 is under posture control or not, in step S64.

If the VSA function and the ABS function are shut down (S64: YES), then the engine ECU 20 judges whether the vehicle 12 is not being steered, thereby confirming that the vehicle 12 is not in a steered posture intending to start immediately while being stopped at an intersection or the like, in step S65.

If the vehicle 12 is not being steered (S65: YES), then the engine ECU 20 judges whether the IS off SW 56 is turned off or not in step S66.

If the IS preconditions are not satisfied (S61: NO), the VSA function and the ABS function are not shut down (S64: NO), the vehicle 12 is being steered (S65: NO), or the IS off SW 56 is not turned off (S66: NO), then the engine ECU 20 controls the meter ECU 32 to de-energize the IS indicator lamp 112 in step S67. If the IS off SW 56 is turned off (S66: YES), then control goes to step S68 in FIG. 10.

In step S68 in FIG. 10, the engine ECU 20 judges whether a deteriorated state (SOH: State Of Health) of the 12 V battery 86 is good or not. Specifically, the engine ECU 20 judges whether or not the SOH acquired from the battery ECU 30 is equal to or greater than a predetermined threshold value (hereinafter referred to as "second battery threshold value THsoh" or "threshold value THsoh").

The SOH is calculated by multiplying the fully charged energy level at present divided by the initial fully charged energy level by 100 {SOH=(fully charged energy level at present/initial fully charged energy level)×100}. The engine ECU 20 can judge in step S68 whether the voltage drop that occurs across the 12 V battery 86 when the starter motor 42 is energized is lower than a predetermined value or not.

The judgment results from steps S51, S52, S47 in FIG. 7 may directly be used as judgment results in steps S69, S70, S72 in FIG. 10.

If the SOH of the battery 86 is good in step S68 (S68: YES), then the engine ECU 20 judges whether or not the activation count Ns of the starter motor 42 is equal to or smaller than a predetermined value, i.e., the threshold value THns, in step S69. If the activation count Ns of the starter motor 42 is equal to or smaller than the predetermined value (S69: YES), then the engine ECU 20 judges whether a fault that inhibits an idling stop has occurred or not in step S70.

If the SOH of the battery 86 is not good (S68: NO), the activation count Ns of the starter motor 42 is not equal to or smaller than the predetermined value (S69: NO), or a fault that inhibits an idling stop has occurred (S70: NO), then the engine ECU 20 controls the meter ECU 32 to light the IS indicator lamp 112 in red in order to indicate to the driver that the engine 16 is not stopped from idling in step S71.

According to the present embodiment, after the IS indicator lamp 112 has been lighted in red, it is continuously lighted in red until the cause is removed, i.e., until the fault corresponding to the stored fault code is eliminated by repairing. Consequently, even if the IS preconditions have come to be not satisfied, the IS indicator lamp 112 is continuously lighted in red.

If a fault that inhibits an idling stop has occurred (S70: NO), then the IS indicator lamp 112 is lighted in red only upon occurrence of a fault recording an IS fault code (second IS fault code) that does not display a warning lamp, e.g., the PGM-FI warning lamp 120, the charging warning lamp 122, or the like, corresponding to a specific ECU, and the IS indicator lamp 112 is de-energized upon occurrence of a fault which records an IS fault code (first IS fault code) that lights a warning lamp corresponding to a specific ECU. However, according to another process, the IS indicator lamp 112 may simultaneously be lighted when a fault recording a first IS fault code has occurred.

If a fault that inhibits an idling stop has not occurred in step S70 (S70: YES), then the engine ECU 20 judges whether the air conditioner 180 requires no excessively large electric power or not in step S72. If the air conditioner 180 requires no excessively large electric power (S72: YES), then the engine ECU 20 controls the meter ECU 32 to de-energize the IS indicator lamp 112 in step S73. If the air conditioner 180 requires excessively large electric power (S72: NO), then the engine ECU 20 controls the meter ECU 32 to blink the IS indicator lamp 112 in green in order to indicate to the driver that the air conditioner 180 requires excessively large electric power in step S74. Other information may be displayed insofar as it indicates to the driver that the air conditioner 180 requires excessively large electric power.

For an easier understanding of the present embodiment, the idling stop control process carried out by the engine ECU 20 (FIG. 4) and the idling stop-related display control process carried out by the engine ECU 20 (FIGS. 9 and 10) have been described separately. However, the idling stop control process shown in FIG. 4 and idling stop-related display control process shown in FIGS. 9 and 10 include many common steps, e.g., steps of judging whether a IS precondition is satisfied or not (S21 in FIG. 4, S61 in FIG. 9). Therefore, the idling stop control process and the idling stop-related display control process may be combined into a control process.

The idling stop-related display control process (FIGS. 9 and 10) has been described as being mainly carried out by the engine ECU 20. However, judgment steps shown in FIGS. 9 and 10 may be carried out by the meter ECU 32 either uniquely or using output signals from the engine ECU 20. If the meter ECU 32 uses output signals from the engine ECU 20, then the meter ECU 32 may judge whether it has received a signal indicating that the engine 16 is being stopped from idling from the engine ECU 20, rather than performing steps S61, S62.

[3. Vehicle Diagnosing Process]

(3-1. Operating Sequence of the Operator)

Figure 11:
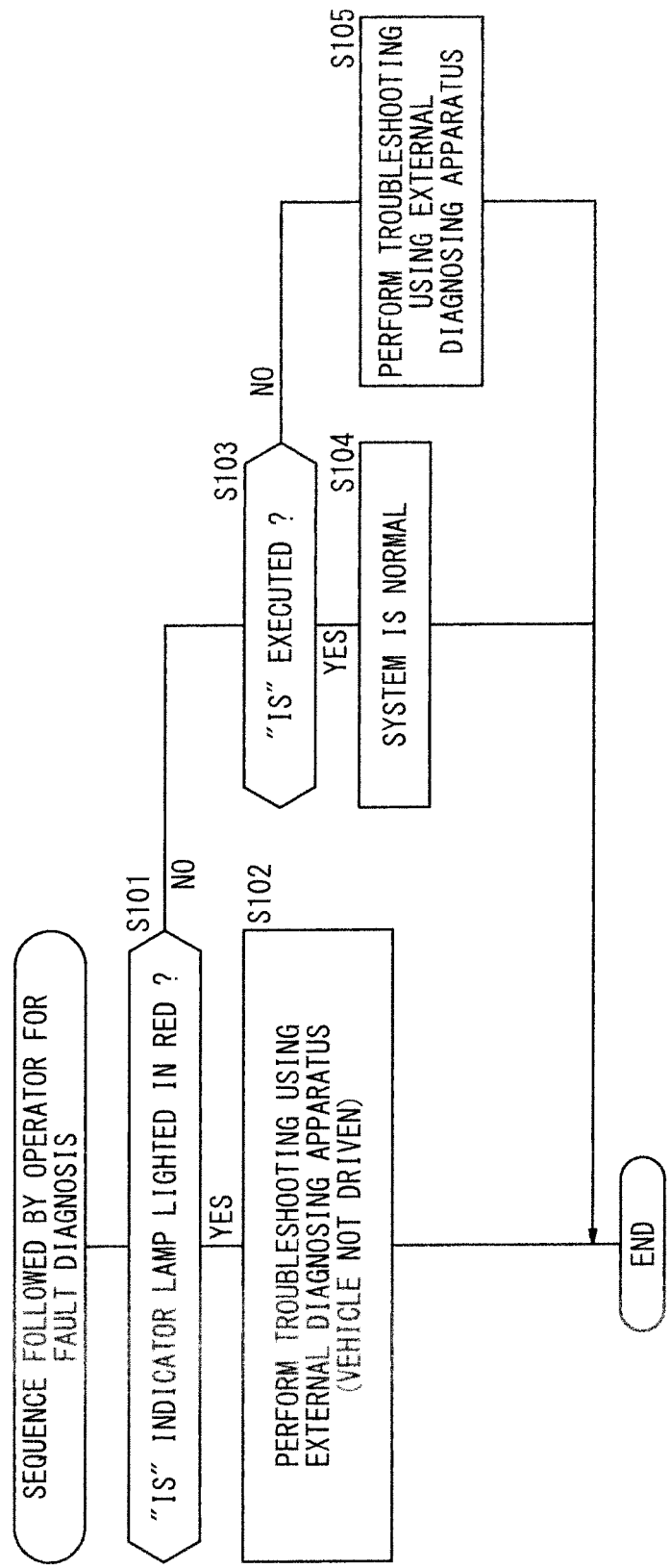
FIG. 11 is a flowchart of a sequence followed when a fault diagnosis is performed on the vehicle using an external diagnosing apparatus.

FIG. 11 is a flowchart of a sequence followed when a fault diagnosis is performed on the vehicle 12 using the external diagnosing apparatus 14. The flowchart shown in FIG. 11 represents a diagnostic sequence followed by the operator when the user of the vehicle 12 has reported that the IS indicator lamp 112 is lighted in red or when the user of the vehicle 12 has reported that the engine 16 often fails to be stopped from idling. If the vehicle 12 suffers a fault that causes a warning lamp, e.g., the PGM-FI warning lamp 120, the charging warning lamp 122, or the like shown in FIG. 2, corresponding to a specific ECU, to be lighted (see FIG. 8), then the operator can identify an ECU based on the lighted warning lamp and proceed with a diagnosis for identifying the cause of the fault.

In step S101, the operator turns on the ignition switch, not shown, and judges whether the IS indicator lamp 112 on the meter display device 92 is turned on in red or not {at this time, the vehicle 12 (the engine 16) is stopping}.

If the IS indicator lamp 112 is lighted in red (S101: YES), then the operator connects the external diagnosing apparatus 14 to the data link connector 194 of the vehicle 12, and reads the fault codes recorded in the ECUs through the external diagnosing apparatus 14, thereby performing a troubleshooting process using the external diagnosing apparatus 14 in step S102.

FIG. 12 shows by way of example a screen displayed when the external diagnosing apparatus 14 has diagnosed the conditions of various components of the vehicle 12 by reading out fault codes recorded in the ECUs of the vehicle 12 while the IS indicator lamp 112 is being lighted in red. Details of FIG. 12 will be described later with reference to FIG. 14. The operator can inspect or repair the vehicle 12 while seeing the displayed screen shown in FIG. 12.

Referring back to step S101 shown in FIG. 11, if the IS indicator lamp 112 is not being lighted in red (S101: NO), then the operator judges whether the idling stop control process is normally performed or not while the vehicle 12 is being driven with the operator sitting on the front passenger seat, for example, in step S103. Specifically, in a test run, the operator asks the driver to repeat a driving behavior in which the engine 16 often fails to be stopped from idling, and confirms that the engine 16 fails to be stopped from idling when the vehicle 12 comes to a halt. In other words, the operator judges whether the engine 16 is automatically shut down while the IS preconditions are being satisfied, and the IS indicator lamp 112 is lighted in green or not.

If the idling stop control process is normally performed and its non-execution is not repeated (S103: YES), then the operator judges that the idling stop control process is normally performed on the vehicle 12 in step S104. As a precautionary measure and in view of the claim made by the user, however, the operator may inspect various components related to the idling stop control process, or may confirm various components of the vehicle 12 using the external diagnosing apparatus 14, as with the case with step S105 to be described below.

If the idling stop control process is not executed (S103: NO), then the operator performs a troubleshooting process using the external diagnosing apparatus 14 in step S105.

Specifically, as with step S102, the operator connects the external diagnosing apparatus 14 to the vehicle 12 to establish communication between the external diagnosing apparatus 14 and the ECUs of the vehicle 12. Then, the operator operates the operating unit 204 of the external diagnosing apparatus 14 to start a diagnosis about the idling stop control process. Thereafter, the operator drives the vehicle 12 to satisfy the IS preconditions.

Specifically, in a test run as described above, the operator asks the driver to repeat a driving behavior in which the engine 16 often fails to be stopped from idling, attempting to replicate the state that the engine fails to be stopped from idling when the vehicle 12 comes to a halt.

The display unit 210 of the external diagnosing apparatus 14 then displays a screen shown in FIG. 13. For example, details of the displayed screen shown in FIG. 13 will be described later with reference to FIG. 15. The operator is now able to analyze reasons why the engine 16 of the vehicle 12 fails to be stopped from idling while seeing the displayed screen shown in FIG. 13.

The operator can then explain to the user the way in which the vehicle 12 is driven with the idling stop control process being not executed, using the displayed screen shown in FIG. 13. For example, if the engine 16 is displayed as being warmed up (S44 in FIG. 7), then the operator judges that the engine 16 has not been warmed up and tells the user the fact that the engine 16 has not been warmed up. If the brake negative pressure Pn is displayed as not being sufficient (S45 in FIG. 7), then the operator can point out that the user has done brake pumping excessively.

(3-2. Processing Sequence of the External Diagnosing Apparatus 14)

(3-2-1. If the IS Indicator Lamp 112 is Lighted in Red)

Figure 14:
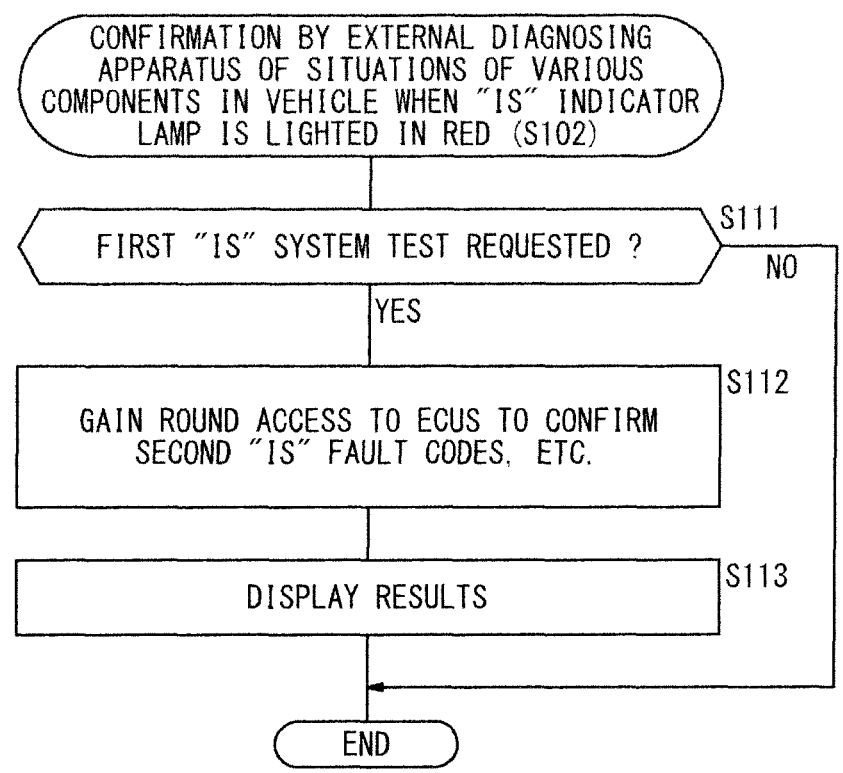
FIG. 14 is a flowchart of a process carried out by the external diagnosing apparatus for confirming the states of various components of the vehicle if the IS indicator lamp is lighted in red.

FIG. 14 is a flowchart of a processing sequence carried out by the external diagnosing apparatus 14 for confirming the states of the various components of the vehicle 12 if the IS indicator lamp 112 is lighted in red. As described above, if the vehicle 12 suffers a fault that causes a warning lamp, e.g., the PGM-FI warning lamp 120, the charging warning lamp 122, or the like shown in FIG. 2, corresponding to a specific ECU, to be lighted, then the operator can identify an ECU based on the lighted warning lamp and proceed with a diagnosis for identifying the cause of the fault. Stated otherwise, the external diagnosing apparatus 14 separately carries out a diagnostic process at the time such a warning lamp is lighted (hereinafter referred to as "specific warning lamp-lighted diagnostic process" and a diagnostic process at the time the idling stop is not executed though a warning lamp corresponding to a specific ECU is not lighted (hereinafter referred to as "IS diagnostic process"). The processing sequence shown in FIG. 14 represents the IS diagnostic process.

In step S111, the external diagnosing apparatus 14 judges whether the operator has made a request for the confirmation of the situations of various components of the vehicle 12 (hereinafter referred to as "first IS system test") or not while the IS indicator lamp 112 is being lighted in red. If there is no request for the first IS system test (S111: NO), then the present cycle of the processing sequence is ended.

If there is a request for the first IS system test (S111: YES), then in step S112 the external diagnosing apparatus 14 communicates with the ECUs to inquire whether there is a cause of the red lighting of the IS indicator lamp 112, e.g., a recorded second IS fault code, or not, and, in the event that there is such a cause, acquires data related to an IS precondition (see FIG. 5) and an IS permitting condition (see FIG. 7) at the time the cause occurs. At this time, the external diagnosing apparatus 14 may communicate with only an ECU that is possibly recording the cause, e.g., an ECU that is possibly recording a second IS fault code.

The action performed by the external diagnosing apparatus 14 to make the rounds of the ECUs to communicate therewith is referred to as "round access". Instead of performing a round access, the external diagnosing apparatus 14 may acquire judgment results from the engine ECU 20, etc.

As described above, the external diagnosing apparatus 14 according to the present embodiment separately carries out a diagnostic process at the time a warning lamp assigned to an individual ECU, e.g., the PGM-FI warning lamp 120, the charging warning lamp 122, or the like, is lighted (specific warning lamp-lighted diagnostic process) and a diagnostic process at the time the idling stop is not executed though the warning lamp is not lighted (IS diagnostic process). An IS fault code that the external diagnosing apparatus 14 inquires about its presence or not in step S112 corresponds to a fault that does not light a warning lamp, i.e., a second IS fault code (see FIG. 8). Stated otherwise, in step S112, the external diagnosing apparatus 14 does not inquire each ECU whether there is a first IS fault code or not. In this manner, the external diagnosing apparatus 14 has its processing load reduced and its processing time shortened.

In step S113, the external diagnosing apparatus 14 displays the judgment result of step S112 on the display unit 210 (see FIG. 12).

As shown in FIG. 12, the judgment result or screen displayed in step S113 displays whether a fault has occurred or not with respect to each of the causes that can light the IS indicator lamp 112 in red. Specifically, the displayed screen shown in FIG. 12 displays whether the SOH of the battery 86 is sufficient or not (S68 in FIG. 10), whether or not the activation count Ns of the starter motor is equal to or smaller than the predetermined value (S69), and whether there are second IS fault codes or not (S70).

As shown in FIG. 12, the display unit 210 displays whether there are recorded second IS fault codes or not and, if there are recorded second IS fault codes, details thereof, with respect to the respective ECUs 20, 22, 24, 26, 28, 30, 32, 34, 36 which may possibly have second IS fault codes recorded.

Therefore, it is possible to display whether there are recorded second IS fault codes or not and, if there are recorded second IS fault codes, details thereof, with respect to the respective ECUs 20, 22, 24, 26, 28, 30, 32, 34, 36 which may possibly have second IS fault codes recorded. The displayed screen shown in FIG. 12 thus makes it easy for the operator to judge and verify the results of the inquiries made by the external diagnosing apparatus 14.

(3-2-2. If the IS Indicator Lamp 112 is not Lighted in Red)

Figure 15:
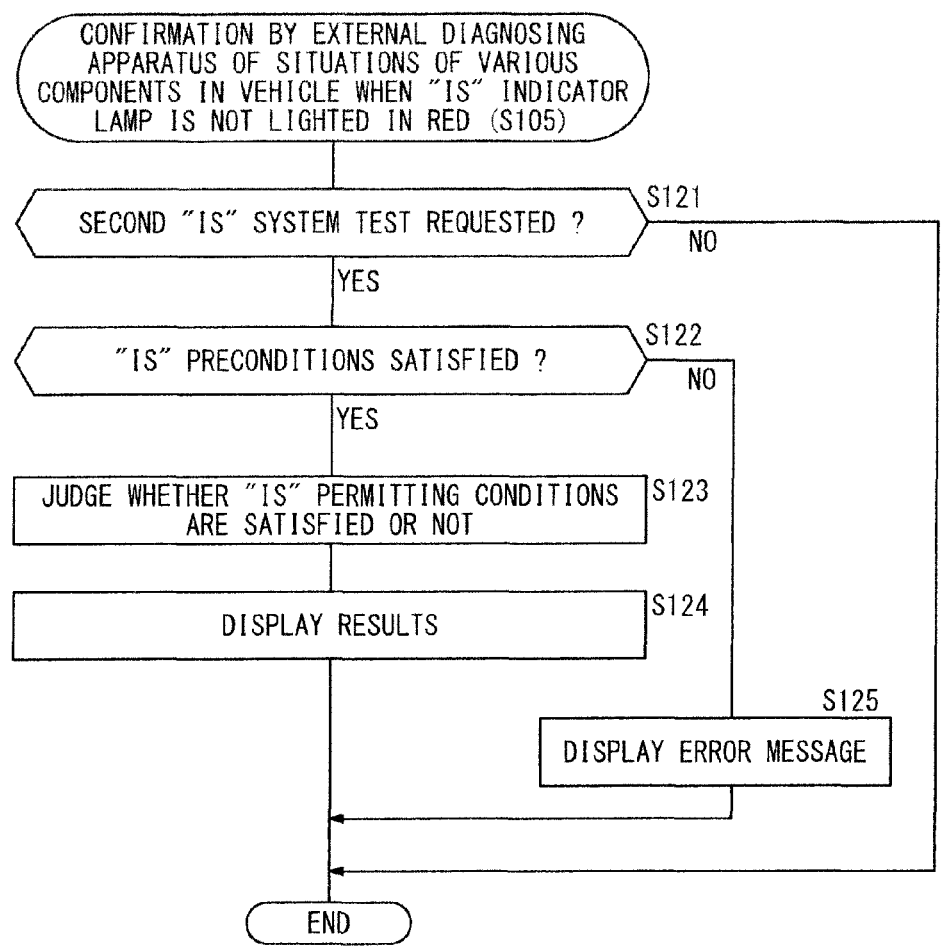
FIG. 15 is a flowchart of a processing sequence carried out by the external diagnosing apparatus for confirming the states of various components of the vehicle the IS indicator lamp is not lighted in red.

FIG. 15 is a flowchart of a processing sequence carried out by the external diagnosing apparatus 14 for confirming the states of the various components of the vehicle 12 if the IS indicator lamp 112 is not lighted in red.

In step S121, the external diagnosing apparatus 14 judges whether the operator has made a request for the confirmation of the situations of various components of the vehicle 12 (hereinafter referred to as "second IS system test") or not while the IS indicator lamp 112 is not being lighted in red. If there is no request for the second IS system test (S121: NO), then the present cycle of the processing sequence is ended.

If there is a request for the second IS system test (S121: YES), then the external diagnosing apparatus 14 judges whether the IS preconditions (see FIG. 5) are satisfied or not by communicating with the engine ECU 20 in step S122. At this time, the external diagnosing apparatus 14 may communicate with the engine ECU 20 only for the purpose of acquiring values for judging whether the IS preconditions are satisfied or not.

If the IS preconditions are satisfied (S122: YES), then the external diagnosing apparatus 14 judges whether the IS permitting conditions (see FIG. 7) are satisfied or not by communicating with the engine ECU 20 in step S123. At this time, the external diagnosing apparatus 14 may communicate with the engine ECU 20 only for the purpose of acquiring values and states for judging whether the IS permitting conditions are satisfied or not.

In step S124, the external diagnosing apparatus 14 displays the judgment result of step S123 on the display unit 210 (see FIG. 13). As shown in FIG. 13, the displayed judgment result or screen displays that the idling stop is not executed because the SOC of the battery 86 is not equal to or greater than 40%. According to the present embodiment, therefore, the judgment results and current states of the IS preconditions and the IS permitting conditions are displayed, and the details of the IS preconditions and the IS permitting conditions are also displayed.

The displayed judgment results, current states, and the IS preconditions and the IS permitting conditions allow the operator to judge which one of the IS preconditions and the IS permitting conditions is not satisfied, and also allow the operator to tell the user that the idling stop is not executed because the vehicle 12 is in a situation where the idling stop should not be executed, rather than suffering a fault, as the result of the judgment. For example, if the engine coolant temperature Tw in the item "ENGINE COOLANT TEMPERATURE" is lower than "45° C." and the engine 16 has not been warmed up, then the operator can point out to the user that the engine 16 has not been warmed up. If the brake negative pressure Pn is lower than "39.1 kPa" in the item "BRAKE NEGATIVE PRESSURE", then the operator can point out to the user that the user has done brake pumping excessively while driving the vehicle 12.

Referring back to step S122 in FIG. 15, if the IS preconditions are not satisfied (S122: NO), then the external diagnosing apparatus 14 displays an error message on the display unit 210 in step S125.

[4. Advantages of the Embodiment]

According to the present embodiment, as described above, for performing a fault diagnosis with respect to the non-execution of an idling stop, second IS fault codes are extracted, but first IS fault codes are not extracted, from the ECUs 20, 22, 24, 26, 28, 30, 32, 34, 36. Therefore, it is possible to narrow down inspection items for the fault diagnosis with respect to the non-execution of the idling stop. In addition, as the ECUs 20, 22, 24, 26, 28, 30, 32, 34, 36 are requested to send second IS fault codes only, the amount of communication between the ECUs 20, 22, 24, 26, 28, 30, 32, 34, 36 and the external diagnosing apparatus 14 is reduced. Consequently, the fault diagnosis with respect to the non-execution of the idling stop can be performed simply and quickly.

The above advantages manifest themselves if there are a great many ECUs, e.g., several hundred ECUs, which may possibly record IS fault codes that are defined as inhibiting the idling stop.

B. Modifications:

The present invention is not limited to the above embodiment, but may employ various arrangements based on the disclosure of the description thereof. For example, the present invention may employ the following arrangements:

[1. Objects Incorporating the Invention]

In the above embodiment, the external diagnosing apparatus 14 is incorporated in the vehicle 12. However, the external diagnosing apparatus 14 may be incorporated in other apparatus, e.g., mobile objects including ships, aircrafts, etc. whose drive source may be stopped from idling. The drive source may not necessarily be a drive source for generating drive power for directly moving a mobile object such as the vehicle 12 or the like, but may be an engine for actuating a motor to generate electric power on the vehicle 12. Alternatively, the drive source may be a drive force generator such as a cooling pump, an air compressor, or the like for use in a mobile object such as the vehicle 12 or a manufacturing apparatus.

[2. Vehicle 12]

(2-1. Arrangement)

In the above embodiment, the vehicle 12 is an MT vehicle. However, the vehicle 12 is not limited to an MT vehicle, but may be other vehicles insofar as their drive source can be stopped from idling, such as an automatic transmission vehicle (AT vehicle), for example.

In the above embodiment, the vehicle 12 is a diesel-powered vehicle. However, the vehicle 12 is not limited to a diesel-powered vehicle, but may be other vehicles insofar as their drive source can be stopped from idling, such as a gasoline-powered vehicle, a hybrid vehicle, or a fuel cell vehicle.

(2-2. Conditions for an Idling Stop)

In the above embodiment, the conditions for use in the idling stop control process (FIG. 4) are separated into the IS preconditions (FIG. 5) and the IS permitting conditions (FIG. 7). However, the conditions for use in the idling stop control process may not necessarily be divided into the IS preconditions and the IS permitting conditions. Specifically, since it is sufficient for those conditions to judge whether an idling stop is to be executed or not according to the idling stop control process, unlike the idling stop-related display control process (FIGS. 9 and 10), the IS preconditions and the IS permitting conditions may be used together as idling stop (IS) conditions.

According to the idling stop-related display control process, if the driver can be notified of a state wherein an idling stop cannot be executed though the IS preconditions are satisfied, then the processing sequences according to the flowcharts shown in FIGS. 9 and 10, i.e., the processing sequences for separately carrying out the steps of judging the IS preconditions and the steps of judging the IS permitting conditions, may not have to be carried out, but operation of the IS indicator lamp 112 may be determined based on a combination of conditions related to an idling stop.

The details of the IS preconditions and the IS permitting conditions for use respectively in the idling stop control process and the idling stop-related display control process may be changed appropriately providing that the IS preconditions include at least one precondition for an idling stop. The one precondition includes a condition that can be recognized by the driver for driving the vehicle 12.

Stated otherwise, a situation in which the driver assumes that the execution of an idling stop may be established as an IS precondition and the IS indicator lamp 112 or the like may indicate that an idling stop is not executed though the IS precondition is satisfied. For example, providing that the IS preconditions include at least one precondition for an idling stop which can be recognized by the driver for driving the vehicle 12, it is possible to establish any conditions included in the IS permitting conditions according to the above embodiment as IS preconditions, and also to establish any conditions included in the IS preconditions according to the above embodiment as IS permitting conditions.

The term "IS permitting conditions" is essentially the same as the term "idling stop (IS) prohibiting conditions" except that satisfying the IS permitting conditions means not satisfying the IS prohibiting conditions.

(2-3. Lighting/Blinking of the IS Indicator Lamp 112)

In the above embodiment, the IS indicator lamp 112 (idling stop failure indicator) is lighted or blinks in green when an idling stop is executed (S63 in FIG. 9 and S74 in FIG. 10), and in red when the idling stop permitting conditions are partly not satisfied (S71 in FIG. 10). However, the IS indicator lamp 112 may be operated otherwise insofar as it allows the driver to judge when an idling stop is executed, when an idling step is not executed though the IS preconditions are satisfied, and when the IS preconditions are not satisfied.

For example, the IS indicator lamp 112 may be lighted in green when an idling stop is executed, in red in S71 in FIG. 10, in yellow when the other IS permitting conditions are not satisfied, and may be de-energized when the IS preconditions are not satisfied.

In the above embodiment, if a second IS fault code is recorded in any of the ECUs, the IS indicator lamp 112 is lighted in red (S70 in FIG. 10: NO→S71). However, a plurality of IS indicator lamps 112 may be provided, and a different IS indicator lamp 112 may be lighted or blink for each of the ECUs.

In the above embodiment, the IS indicator lamp 112 is used to indicate the non-execution of an idling stop when a second IS fault code is recorded. However, the non-execution of an idling stop may be indicated differently, e.g., on the fifth display unit 102 (MID).

[3. External Diagnosing Apparatus 14]

(3-1. Arrangement)

In the above embodiment, the external diagnosing apparatus 14 may be a single unit comprising a laptop personal computer, a tablet computer, or a smart phone that is commercially available, for example. However, the external diagnosing apparatus 14 may be a combination of a personal computer as a main unit and a slave unit (tester) as an interface with the vehicle 12.

In the above embodiment, the external diagnosing apparatus 14 communicates with each of the ECUs through the communication cable 200. However, the external diagnosing apparatus 14 may communicate with each of the ECUs through a wireless link.

The diagnostic software used by the external diagnosing apparatus 14 is prerecorded in the memory 208. However, the diagnostic software may be downloaded from an external source, e.g., an external server that can be accessed through a public network, or may be executed using a download-free ASP (Application Service Provider).

(3-2. Control)

In the flowchart shown in FIG. 14, the external diagnosing apparatus 14 requests the ECUs 20, 22, 24, 26, 28, 30, 32, 34, 36 which may possibly have second IS fault codes recorded to send only second IS fault codes. However, the external diagnosing apparatus 14 may request the ECUs 20, 22, 24, 26, 28, 30, 32, 34, 36 to send data insofar as they include second IS fault codes. For example, the external diagnosing apparatus 14 may request the ECUs 20, 22, 24, 26, 28, 30, 32, 34, 36 to send first IS fault codes and second IS fault codes, and then the second IS fault codes may be extracted on the side of the external diagnosing apparatus 14. Alternatively, the external diagnosing apparatus 14 may request the ECUs 20, 22, 24, 26, 28, 30, 32, 34, 36 to send all fault codes (first IS fault codes, second IS fault codes, and non-IS fault codes) or second IS fault codes and non-IS fault codes, and then the second IS fault codes may be extracted on the side of the external diagnosing apparatus 14.

If fault codes other than second IS fault codes are sent, they may be processed as follows: The external diagnosing apparatus 14 may have a database included in the memory 208, the database having registered second IS fault codes corresponding to the ECUs 20, 22, 24, 26, 28, 30, 32, 34, 36 which may possibly have second IS fault codes recorded, or may download such a database from an external source.

Then, the external diagnosing apparatus 14 reads out second IS fault codes and other fault codes from the ECUs 20, 22, 24, 26, 28, 30, 32, 34, 36 which may possibly have second IS fault codes recorded. The external diagnosing apparatus 14 may then compare the read fault codes with the fault codes registered in the database in association with the ECUs 20, 22, 24, 26, 28, 30, 32, 34, 36 which may possibly have second IS fault codes recorded, and extract second IS fault codes.

Consequently, even though the fault codes read by the external diagnosing apparatus 14 include fault codes other than second IS fault codes, the external diagnosing apparatus 14 can simply extract second IS fault codes.

(3-3. Displayed Screens)

In the above embodiment, the diagnostic result from the external diagnosing apparatus 14 is displayed on the display unit 210 thereof. However, the diagnostic result from the external diagnosing apparatus 14 may be displayed on a monitor, not shown, of a navigation device, not shown, on the vehicle 12.

In the above embodiment, the screens shown in FIGS. 12 and 13 are displayed on the display unit 210. However, screens for displaying diagnostic results are not limited to those illustrated screens.

For example, in FIGS. 12 and 13, the details of the IS permitting conditions that are satisfied are displayed in addition to the details of the IS permitting conditions that are not satisfied. However, only the details of the IS permitting conditions that are not satisfied may be displayed.

According to the flowchart shown in FIG. 15, the screen (FIG. 13) is displayed only if the IS preconditions are satisfied (S122: YES→S124 in FIG. 15). However, even if the IS preconditions are not satisfied, a screen with respect to at least one of the IS preconditions and the IS permitting conditions may be displayed. In this case, it is preferable to display on the screen information about whether the IS preconditions are satisfied or not.

The invention claimed is:

1. A vehicle diagnosing system for performing a fault diagnosis of a vehicle by performing communication between a plurality of electronic control units in the vehicle and an external diagnosing apparatus and reading out fault codes recorded in the electronic control units into the external diagnosing apparatus, wherein the vehicle comprises:
   a plurality of warning lamps associated with specific ones of the electronic control units, and configured to demand an inspection or repair of a failure which has occurred in the vehicle; and
   an idling stop controller configured to automatically execute an idling stop for stopping a drive source of the vehicle from idling when a predetermined condition is satisfied;
   wherein when the electronic control units detect a fault in target ranges controlled thereby, the electronic control units record the fault codes;
   the fault codes include idling stop fault codes defined as inhibiting the idling stop, and non-idling stop fault codes not defined as inhibiting the idling stop;
   the idling stop fault codes include first idling stop fault codes defined as energizing the warning lamps and second idling stop fault codes not defined as energizing the warning lamps; and
   for performing a fault diagnosis with respect to non-execution of the idling stop, the external diagnosing apparatus extracts only the second idling stop fault codes, among the first idling stop fault codes and the second idling stop fault codes, from the electronic control units.

2. The vehicle diagnosing system according to claim 1, wherein the external diagnosing apparatus:
   inquires of the electronic control units which may possibly have the second idling stop fault codes recorded, for recorded second idling stop fault codes; and
   displays answers from the electronic control units on a display unit of the external diagnosing apparatus in association with the electronic control units.

3. The vehicle diagnosing system according to claim 1, wherein the external diagnosing apparatus:
   comprises a database having the second idling stop fault codes registered in association with the electronic control units which may possibly have the second idling stop fault codes recorded; and
   reads out the second idling stop fault codes and other fault codes from the electronic control units which may possibly have the second idling stop fault codes recorded, compares the read fault codes with the fault codes registered in the database in association with the electronic control units which may possibly have the second idling stop fault codes recorded, and extracts the second idling stop fault codes.

4. The vehicle diagnosing system according to claim 1, wherein the vehicle includes:
   separately from the warning lamps, an idling stop failure indicator configured to indicate an idling stop fault corresponding to one of the second idling stop fault codes when the idling stop fault which records the one of the second idling stop fault codes in any of the electronic control units has occurred.

5. A vehicle diagnosing method of performing a fault diagnosis of a vehicle by performing communication between a plurality of electronic control units in the vehicle and an external diagnosing apparatus and reading out fault codes recorded in the electronic control units into the external diagnosing apparatus, wherein the vehicle comprises:
   a plurality of warning lamps associated with specific ones of the electronic control units, and configured to demand an inspection or repair of a failure which has occurred in the vehicle; and
   an idling stop controller configured to automatically execute an idling stop for stopping a drive source of the vehicle from idling when a predetermined condition is satisfied;
   wherein when the electronic control units detect a fault in target ranges controlled thereby, the electronic control units record the fault codes;
   the fault codes include idling stop fault codes defined as inhibiting the idling stop, and non-idling stop fault codes not defined as inhibiting the idling stop;
   the idling stop fault codes include first idling stop fault codes defined as energizing the warning lamps and second idling stop fault codes not defined as energizing the warning lamps; and
   for performing a fault diagnosis with respect to non-execution of the idling stop, the external diagnosing apparatus extracts only the second idling stop fault codes, among the first idling stop fault codes and the second idling stop fault codes, from the electronic control units.

6. An external diagnosing apparatus for performing a fault diagnosis of a vehicle by communicating with a plurality of electronic control units in the vehicle and reading out fault codes recorded in the electronic control units into the external diagnosing apparatus, wherein
   the fault codes are recorded when the electronic control units detect a fault in target ranges controlled thereby;
   the fault codes include idling stop fault codes defined as inhibiting an idling stop for stopping a drive source of the vehicle from idling, and non-idling stop fault codes not defined as inhibiting the idling stop;
   the idling stop fault codes include:
   first idling stop fault codes defined as energizing warning lamps of the vehicle, the warning lamps being associated with specific ones of the electronic control units and configured to demand an inspection or repair of a failure which has occurred in the vehicle; and
   second idling stop fault codes not defined as energizing the warning lamps; and
   for performing a fault diagnosis with respect to the non-execution of the idling stop, the external diagnosing apparatus extracts only the second idling stop fault codes, among the first idling stop fault codes and the second idling stop fault codes, from the electronic control units.

* * * * *